US012296583B2

(12) United States Patent
Aimono

(10) Patent No.: US 12,296,583 B2
(45) Date of Patent: May 13, 2025

(54) LIQUID EJECTING APPARATUS AND METHOD FOR CONTROLLING LIQUID EJECTING HEAD

(71) Applicant: SEIKO EPSON CORPORATION, Tokyo (JP)

(72) Inventor: Takanori Aimono, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 260 days.

(21) Appl. No.: 18/178,797

(22) Filed: Mar. 6, 2023

(65) Prior Publication Data

US 2023/0278331 A1 Sep. 7, 2023

(30) Foreign Application Priority Data

Mar. 7, 2022 (JP) ................................ 2022-034240

(51) Int. Cl.
*B41J 2/045* (2006.01)

(52) U.S. Cl.
CPC ....... *B41J 2/04516* (2013.01); *B41J 2/04573* (2013.01); *B41J 2/04581* (2013.01); *B41J 2/04588* (2013.01); *B41J 2/04595* (2013.01)

(58) Field of Classification Search
CPC ......................... B41J 2/04516; B41J 2/04541; B41J 2/04573; B41J 2/04581; B41J 2/04588
See application file for complete search history.

(56) References Cited

U.S. PATENT DOCUMENTS 8,651,633 B2 * 2/2014 Marcus .................... B41J 2/085 347/78
2011/0141172 A1 6/2011 Menzel et al.
2013/0038651 A1 * 2/2013 Satou ................... B41J 2/04593 347/9
2014/0225949 A1 8/2014 Kitaoka
2014/0240384 A1 * 8/2014 Yokomaku ........... B41J 2/04588 347/11
2017/0320321 A1 11/2017 Makinose et al.

FOREIGN PATENT DOCUMENTS

JP 2000-094671 A 4/2000
JP 2011-121368 A 6/2011
JP 2014-133350 A 7/2014
JP 2014-177114 A 9/2014
JP 2017-140761 A 8/2017
JP 2017-202571 A 11/2017

* cited by examiner

*Primary Examiner* — Anh T Vo
(74) *Attorney, Agent, or Firm* — WORKMAN NYDEGGER

(57) ABSTRACT

A liquid ejecting apparatus comprises a liquid ejecting head having a drive element that is driven in accordance with a drive signal to eject liquid droplets from a nozzle. The drive signal comprises a first drive waveform including a first contraction waveform to eject a first liquid droplet and a second drive waveform including a second contraction waveform to eject a second liquid droplet which merges with the first liquid droplet before the first liquid droplet lands onto a medium. The first contraction waveform includes a first segment waveform along which the potential changes, a second segment waveform along which the potential is kept, and a third segment waveform along which the potential changes. The second contraction waveform includes a fourth segment waveform along which the potential changes, a fifth segment waveform along which the potential is kept, and a sixth segment waveform along which the potential changes.

16 Claims, 9 Drawing Sheets

LIQUID EJECTING APPARATUS AND METHOD FOR CONTROLLING LIQUID EJECTING HEAD

The present application is based on, and claims priority from JP Application Serial Number 2022-034240, filed Mar. 7, 2022, the disclosure of which is hereby incorporated by reference herein in its entirety.

BACKGROUND

1. Technical Field

Embodiments of the present disclosure relate to a liquid ejecting apparatus and a method for controlling a liquid ejecting head.

2. Related Art

A liquid ejecting apparatus that prints an image by ejecting a liquid such as ink from a plurality of nozzles by using piezoelectric elements is known. In a liquid ejecting apparatus of this kind, for example, a piezoelectric element causes a pressure compartment that is in communication with a nozzle to contract in accordance with a drive signal that includes a pulse for ejecting ink from the nozzle, thereby ejecting the ink present inside the pressure compartment from the nozzle. Also known as a method for controlling a liquid ejecting apparatus is a method of supplying a plurality of pulses to piezoelectric elements and causing a plurality of liquid droplets ejected from each nozzle to merge together before landing onto a surface of a print medium. For example, JP-A-2017-140761 discloses a printing apparatus that includes an ejecting head configured to perform droplet ejection from a nozzle onto a predetermined position on a print medium and a control unit configured to output, to the ejecting head, a drive waveform that enables a plurality of liquid droplets to merge together at a distance that is not longer than one half of a distance from the nozzle to the print medium.

As compared with ink having a low viscosity, ink having a high viscosity tends to form a longer tail continuous to ink ejected from a nozzle and is therefore prone to mist generation. A "mist" is vaporous micro-droplets of ink. When a mist is generated, the quality of a print image will be lower than in a case where no mist is generated. Therefore, it is desirable to suppress mist generation in a liquid ejecting apparatus.

SUMMARY

A liquid ejecting apparatus according to a certain aspect of the present disclosure includes: a liquid ejecting head having an ejecting portion, the ejecting portion including a nozzle from which liquid droplets are ejected, a pressure compartment that is in communication with the nozzle, and a drive element that causes pressure changes in a liquid present inside the pressure compartment in accordance with a drive signal; and a control unit that controls supply of the drive signal to the drive element, wherein the drive signal includes a first drive waveform, and a second drive waveform posterior to the first drive waveform, the first drive waveform includes a first expansion waveform along which potential of the drive signal changes to a first level such that capacity of the pressure compartment expands, and a first contraction waveform along which the potential of the drive signal changes from the first level to a second level such that the capacity of the pressure compartment contracts, the second drive waveform includes a second expansion waveform along which the potential of the drive signal changes to the first level such that the capacity of the pressure compartment expands, and a second contraction waveform along which the potential of the drive signal changes from the first level to the second level such that the capacity of the pressure compartment contracts, the first contraction waveform includes a first segment waveform along which the potential of the drive signal changes from the first level to a first intermediate level between the first level and the second level, a second segment waveform along which the potential of the drive signal is kept at the first intermediate level, and a third segment waveform along which the potential of the drive signal changes from the first intermediate level to the second level, the second contraction waveform includes a fourth segment waveform along which the potential of the drive signal changes from the first level to a second intermediate level between the first level and the second level, a fifth segment waveform along which the potential of the drive signal is kept at the second intermediate level, and a sixth segment waveform along which the potential of the drive signal changes from the second intermediate level to the second level, and due to the supply of the drive signal, the drive element operates to cause ejection of a first liquid droplet from the nozzle in accordance with the first drive waveform and operates to cause ejection of a second liquid droplet from the nozzle in accordance with the second drive waveform such that the second liquid droplet merges with the first liquid droplet before the first liquid droplet lands onto a medium.

Another aspect of the present disclosure is a method for controlling a liquid ejecting head having an ejecting portion, the ejecting portion including a nozzle from which liquid droplets are ejected, a pressure compartment that is in communication with the nozzle, and a drive element that causes pressure changes in a liquid present inside the pressure compartment in accordance with a drive signal, the method comprising: controlling supply of the drive signal to the drive element; wherein the drive signal includes a first drive waveform, and a second drive waveform posterior to the first drive waveform, the first drive waveform includes a first expansion waveform along which potential of the drive signal changes to a first level such that capacity of the pressure compartment expands, and a first contraction waveform along which the potential of the drive signal changes from the first level to a second level such that the capacity of the pressure compartment contracts, the second drive waveform includes a second expansion waveform along which the potential of the drive signal changes to the first level such that the capacity of the pressure compartment expands, and a second contraction waveform along which the potential of the drive signal changes from the first level to the second level such that the capacity of the pressure compartment contracts, the first contraction waveform includes a first segment waveform along which the potential of the drive signal changes from the first level to a first intermediate level between the first level and the second level, a second segment waveform along which the potential of the drive signal is kept at the first intermediate level, and a third segment waveform along which the potential of the drive signal changes from the first intermediate level to the second level, the second contraction waveform includes a fourth segment waveform along which the potential of the drive signal changes from the first level to a second intermediate level between the first level and the second level, a fifth segment waveform along which the potential of the drive signal is kept at the second intermediate level, and a sixth segment waveform along which the potential of the drive signal changes from the second intermediate level to the second level, and due to the supply of the drive signal, the drive element operates to cause ejection of a first liquid droplet from the nozzle in accordance with the first drive waveform and operates to cause ejection of a second liquid droplet from the nozzle in accordance with the second drive waveform such that the second liquid droplet merges with the first liquid droplet before the first liquid droplet lands onto a medium.

DESCRIPTION OF EXEMPLARY EMBODIMENTS

Figure 1:
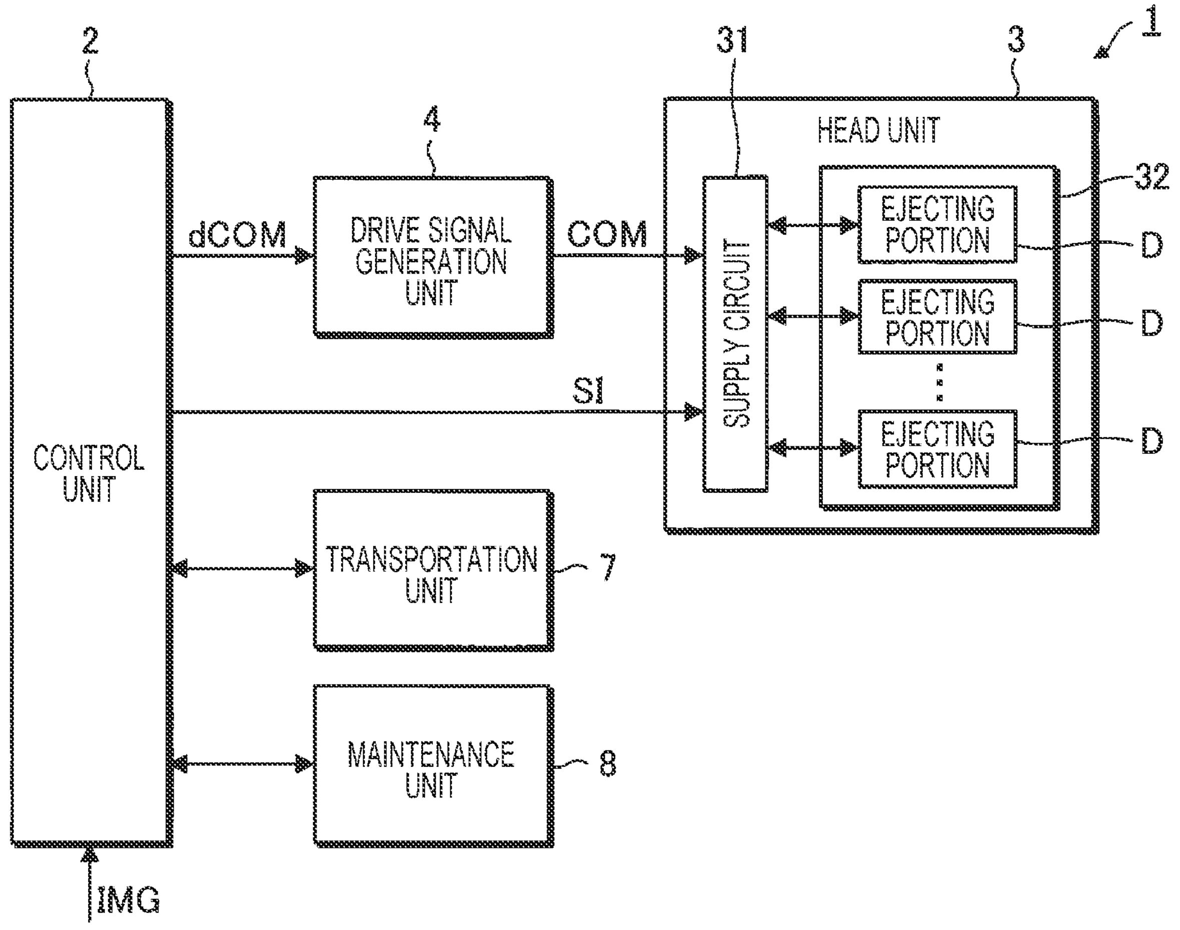
FIG. 1 is a block diagram illustrating an example of a configuration of an ink-jet printer according to an exemplary embodiment of the present disclosure.

With reference to the accompanying drawings, a certain exemplary embodiment of the present disclosure will now be explained. In the drawings, the dimensions and scales of components may be made different from those in actual implementation. Since the embodiment described below shows some preferred examples of the present disclosure, they contain various technically-preferred limitations. However, the scope of the present disclosure shall not be construed to be limited to the examples described below unless and except where the description contains an explicit mention of an intent to limit the present disclosure.

1. Exemplary Embodiment

In the present embodiment, a liquid ejecting apparatus will be described while taking, as an example, an ink-jet printer that forms an image by ejecting ink onto recording paper. In the present embodiment, ink is an example of a "liquid", and recording paper is an example of a "medium".

FIG. 1 is a block diagram illustrating an example of a configuration of an ink-jet printer 1 according to an exemplary embodiment of the present disclosure.

Figure 2:
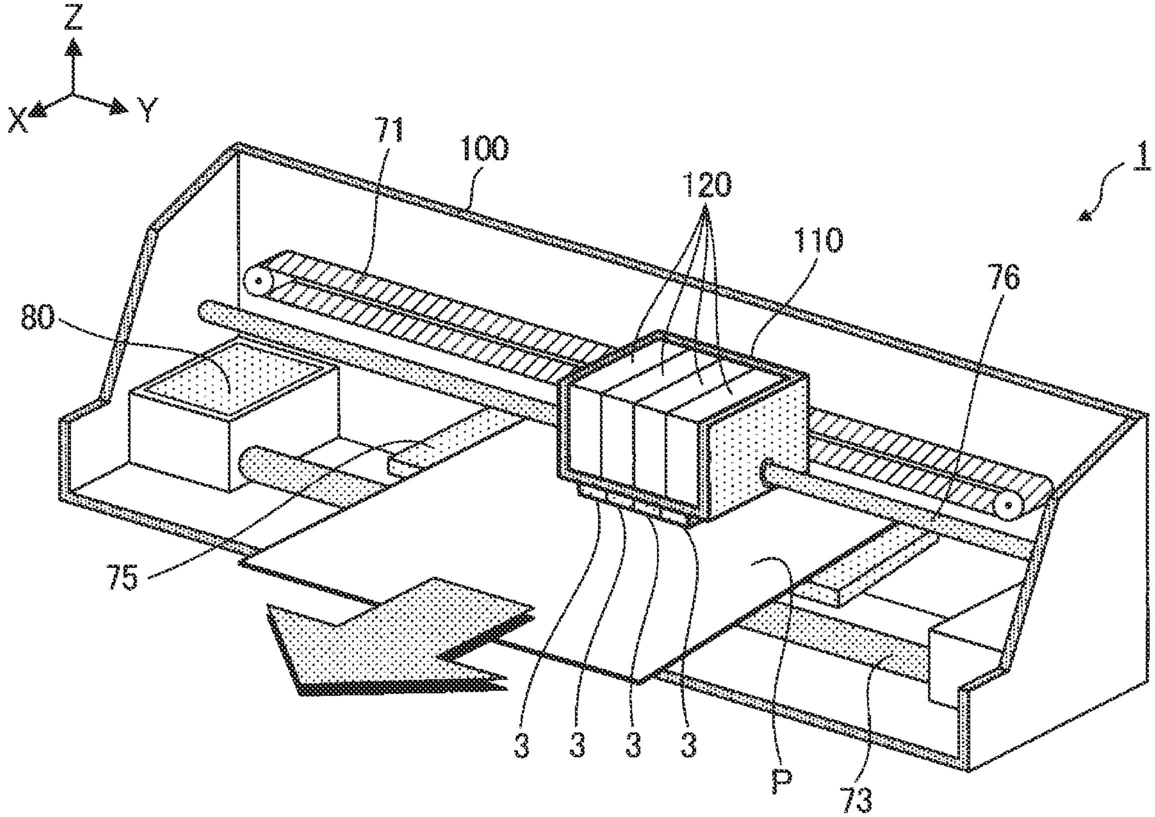
FIG. 2 is a perspective view illustrating an example of a schematic internal structure of the ink-jet printer.

Print data IMG, which represents an image to be formed by the ink-jet printer 1, is supplied to the ink-jet printer 1 from a host computer such as, for example, a personal computer or a digital camera. The ink-jet printer 1 performs print processing of forming, on a medium, an image depicted by the print data IMG supplied from the host computer. In the present embodiment, recording paper P to be mentioned later with reference to FIG. 2 is assumed as the medium.

The ink-jet printer 1 includes a control unit 2, which controls each component of the ink-jet printer 1, a head unit(s) 3, in which an ejecting portion(s) D configured to eject ink is provided, and a drive signal generation unit(s) 4, which generates a drive signal COM for driving the ejecting portion(s) D. The ink-jet printer 1 further includes a transportation unit 7, which changes the relative position of the recording paper P in relation to the head unit 3, and a maintenance unit 8, which performs maintenance processing for maintenance of the ejecting portion(s) D provided in the head unit 3.

In the present embodiment, it is assumed that the head unit(s) 3 and the drive signal generation unit(s) 4 correspond to each other. For example, the ink-jet printer 1 may include a plurality of head units 3 and a plurality of drive signal generation units 4 corresponding to the plurality of head units 3 on a one-to-one correspondence basis. Alternatively, the ink-jet printer 1 may include a single head unit 3 and a single drive signal generation unit 4 corresponding to the single head unit 3. In the present embodiment, it is assumed that the ink-jet printer 1 includes four head units 3 and four drive signal generation units 4 corresponding to the four head units 3 on a one-to-one correspondence basis. However, for a simpler explanation, as illustrated as an example in FIG. 1, a description will be given below while, where appropriate, focusing on one head unit 3 among the four head units 3 and on one signal generation unit 4 among the four drive signal generation units 4. The head unit 3 is an example of a "liquid ejecting head".

The control unit 2 includes one or more central processing units (CPU). The control unit 2 may include a programmable logic device such as a field-programmable gate array (FPGA) in addition to, or in place of, the CPU. The control unit 2 further includes either one or both of a volatile memory such as a random access memory (RAM) and a nonvolatile memory such as a read-only memory (ROM), an electrically erasable programmable read-only memory (EEPROM), or programmable ROM (PROM).

As will be described in detail later, the control unit 2 generates signals for controlling the operation of the components of the ink-jet printer 1, for example, a print signal SI, a waveform specifying signal dCOM, and the like. The waveform specifying signal dCom is a digital signal for specifying the waveform of the drive signal Com. The drive signal Com is an analog signal for driving the ejecting portion D. The print signal SI is a digital signal for specifying the type of operation of the ejecting portion D. Specifically, the print signal SI is a signal for specifying the type of operation of the ejecting portion D by specifying whether or not to supply the drive signal COM to the ejecting portion D. The control unit 2 is an example of a "control unit".

The drive signal generation unit 4 includes, for example, a digital analog converter (DAC), and generates the drive signal COM, based on the waveform specifying signal dCOM supplied from the control unit 2. For example, the drive signal generation unit 4 generates the drive signal COM having a waveform specified by the waveform specifying signal dCOM. The drive signal generation unit 4 outputs the drive signal COM generated based on the waveform specifying signal dCOM to a supply circuit 31 included in the head unit 3.

The head unit 3 includes the supply circuit 31 and a recording head 32.

The recording head 32 includes an M number of the ejecting portion(s) D. The value of M is a natural number that is not less than 1. In the description below, among the M number of the ejecting portions D provided in the recording head 32, the m-th (meaning "ordinal number m") ejecting portion D may be denoted as the ejecting portion D[m], where appropriate. In this definition, the variable number m is a natural number that satisfies "1≤m≤M". Moreover, in the description below, when a certain component, a certain signal, etc. of the ink-jet printer 1 corresponds to the ejecting portion D[m] among the M number of the ejecting portions D, a suffix [m] may be appended to the reference sign of this component, this signal, etc., where appropriate.

Figure 5:
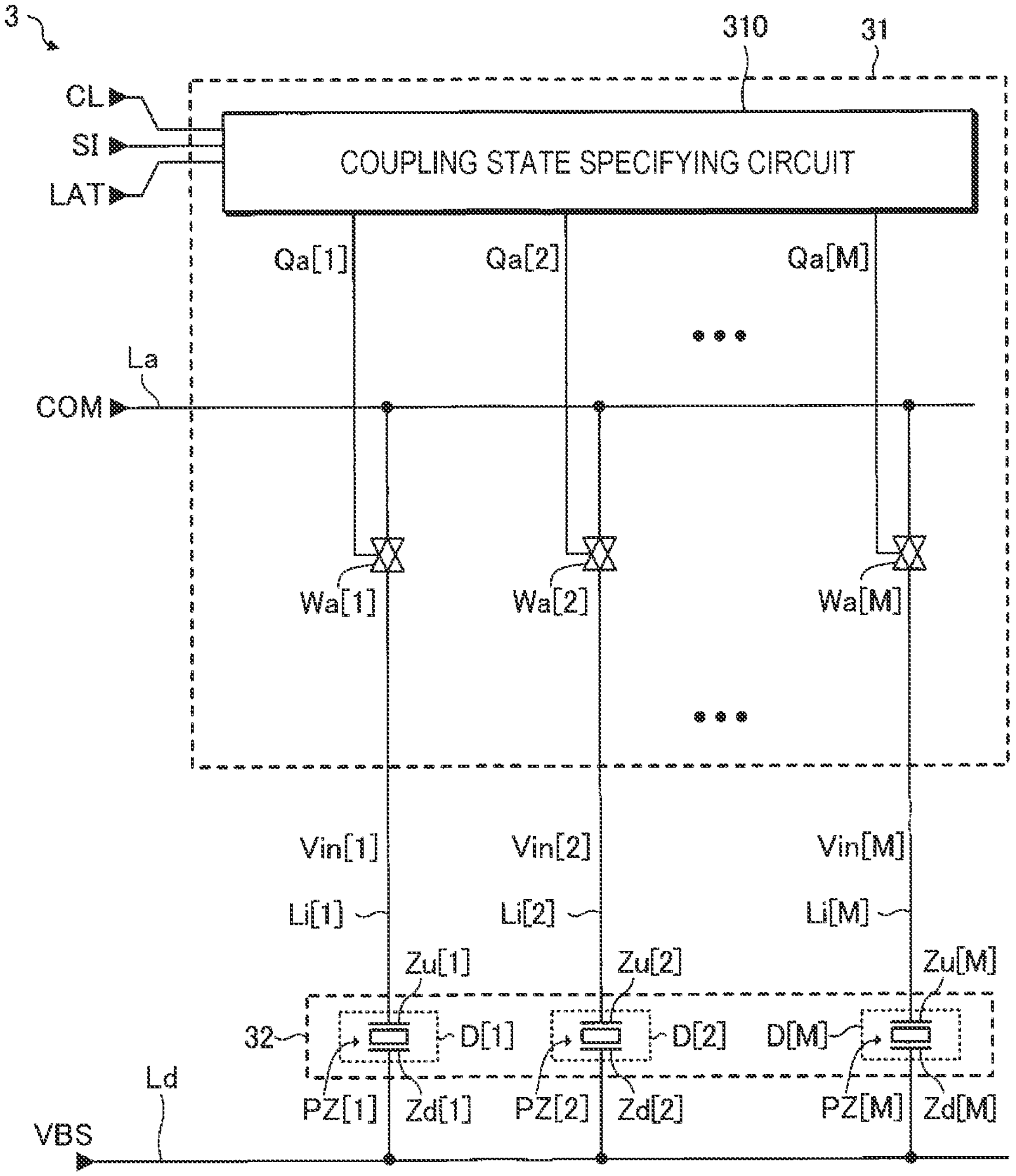
FIG. 5 is a block diagram illustrating an example of a configuration of the head unit.

Based on the print signal SI, the supply circuit 31 switches whether or not to supply the drive signal COM to the ejecting portion D[m]. In the description below, as illustrated in FIG. 5, etc., which will be described later, the drive signal COM supplied to the ejecting portion D[m] may be referred to as an individual drive signal Vin[m], where appropriate.

As described above, in the present embodiment, the ink-jet printer 1 performs print processing. When print processing is performed, based on the print data IMG, the control unit 2 generates signals such as the print signal SI for controlling the head unit 3. In addition, when print processing is performed, the control unit 2 generates signals such as the waveform specifying signal dCOM for controlling the drive signal generation unit 4. Moreover, when print processing is performed, the control unit 2 generates a signal for controlling the transportation unit 7. By means of these signals, in print processing, the control unit 2 controls whether or not to eject ink from the ejecting portion D[m] and adjusts an amount of ink that is ejected and a timing of ink ejection, and the like while controlling the transportation unit 7 so as to change the relative position of the recording paper P in relation to the head unit 3. In this way, the control unit 2 controls the components of the ink-jet printer 1 so that an image corresponding to the print data IMG will be formed on the recording paper P.

As described above, in the present embodiment, the ink-jet printer 1 performs maintenance processing. For example, the maintenance processing includes flushing processing of forcibly discharging ink out of the ejecting portion D, wiping processing of wiping off a foreign substance such as ink that is on the neighborhood of the nozzle N of the ejecting portion D by using a wiper, and pumping processing of sucking ink present inside the ejecting portion D by using a tube pump and the like. The nozzle N will be described later with reference to FIG. 3.

The maintenance unit 8 includes a discharged ink receiver 80 configured to receive discharged ink when the ink is forcibly discharged out of the ejecting portion D in flushing processing, a wiper configured to wipe off a foreign substance such as ink that is on the neighborhood of the nozzle N of the ejecting portion D, and a tube pump configured to suck ink and air bubbles and the like that are present inside the ejecting portion D. The discharged ink receiver 80 is illustrated in FIG. 2 described below. The wiper and the tube pump are not illustrated. Next, with reference to FIG. 2, a schematic internal structure of the ink-jet printer 1 will now be described.

FIG. 2 is a perspective view illustrating an example of a schematic internal structure of the ink-jet printer 1.

As illustrated in FIG. 2, in the present embodiment, a case where the ink-jet printer 1 is a serial printer is assumed. Specifically, when print processing is performed, the ink-jet printer 1 forms dots corresponding to the print data IMG on the recording paper P by ejecting ink from the ejecting portion D[m] while reciprocating the head unit 3 in a main-scan direction intersecting with a sub-scan direction and while transporting the recording paper P in the sub-scan direction.

In the description below, three axes including an X axis, a Y axis, and a Z axis, which are orthogonal to one another, are introduced in order to facilitate an explanation. In the description below, the direction pointed by an arrow of the X axis will be referred to as a +X direction, and the direction that is the opposite of the +X direction will be referred to as a −X direction. The direction pointed by an arrow of the Y axis will be referred to as a +Y direction, and the direction that is the opposite of the +Y direction will be referred to as a −Y direction. The direction pointed by an arrow of the Z axis will be referred to as a +Z direction, and the direction that is the opposite of the +Z direction will be referred to as a −Z direction. In the description below, the +X direction and the −X direction may be referred to as the X direction without making a distinction therebetween, where appropriate. The +Y direction and the −Y direction may be referred to as the Y direction without making a distinction therebetween, where appropriate. The +Z direction and the −Z direction may be referred to as the Z direction without making a distinction therebetween, where appropriate. In the present embodiment, the +X direction is defined as the sub-scan direction, and the +Y direction and the −Y direction are defined as the main-scan direction. In addition, in the present embodiment, as illustrated in FIG. 2, the −Z direction is defined as the direction in which ink is ejected from the ejecting portion D[m].

The ink-jet printer 1 according to the present embodiment includes a cabinet 100 and a carriage 110. The carriage 110 is capable of reciprocating inside the cabinet 100. Four head units 3 are mounted on the carriage 110.

In the present embodiment, it is assumed that four ink cartridges 120 corresponding to ink of four color components, specifically, cyan, magenta, yellow, and black, on a one-to-one correspondence basis are encased in the carriage 110. In the present embodiment, as described earlier, it is assumed that the ink-jet printer 1 includes four head units 3 corresponding to the four ink cartridges 120 on a one-to-one correspondence basis. Each ejecting portion D[m] receives ink supply from the ink cartridge 120 corresponding to the head unit 3 in which this ejecting portion D[m] is provided. Therefore, each ejecting portion D[m] is capable of being filled with the supplied ink and ejecting it through the nozzle N. The ink cartridges 120 may be provided outside the carriage 110.

As described earlier with reference to FIG. 1, the ink-jet printer 1 according to the present embodiment includes the transportation unit 7. The transportation unit 7 includes a carriage transportation mechanism 71, which causes the carriage 110 to reciprocate in the Y direction, and a carriage guide shaft 76, which supports the carriage 110 such that it can reciprocate in the Y direction. The transportation unit 7 further includes a medium transportation mechanism 73, which transports the recording paper P, and a platen 75, which is provided on the −Z-directional side with respect to the carriage 110. For example, in print processing, the carriage transportation mechanism 71 causes the head units 3 together with the carriage 110 to reciprocate in the Y direction along the carriage guide shaft 76, and the medium transportation mechanism 73 transports the recording paper P on the platen 75 in the +X direction. Therefore, in print processing, the transportation unit 7 changes the relative position of the recording paper P in relation to the head units 3 by causing the carriage transportation mechanism 71 and the medium transportation mechanism 73 to perform the operation described above, thereby enabling ejection of ink onto the entire area of the recording paper P. In the present embodiment, it is assumed that a plurality of ink droplets merging together before landing onto a surface of the recording paper P is ejected from the nozzle N. The ink droplet is a micro drop of ink. The ink droplet is an example of a "liquid droplet".

Next, with reference to FIG. 3, a schematic structure of the recording head 32 will now be described.

Figure 3:
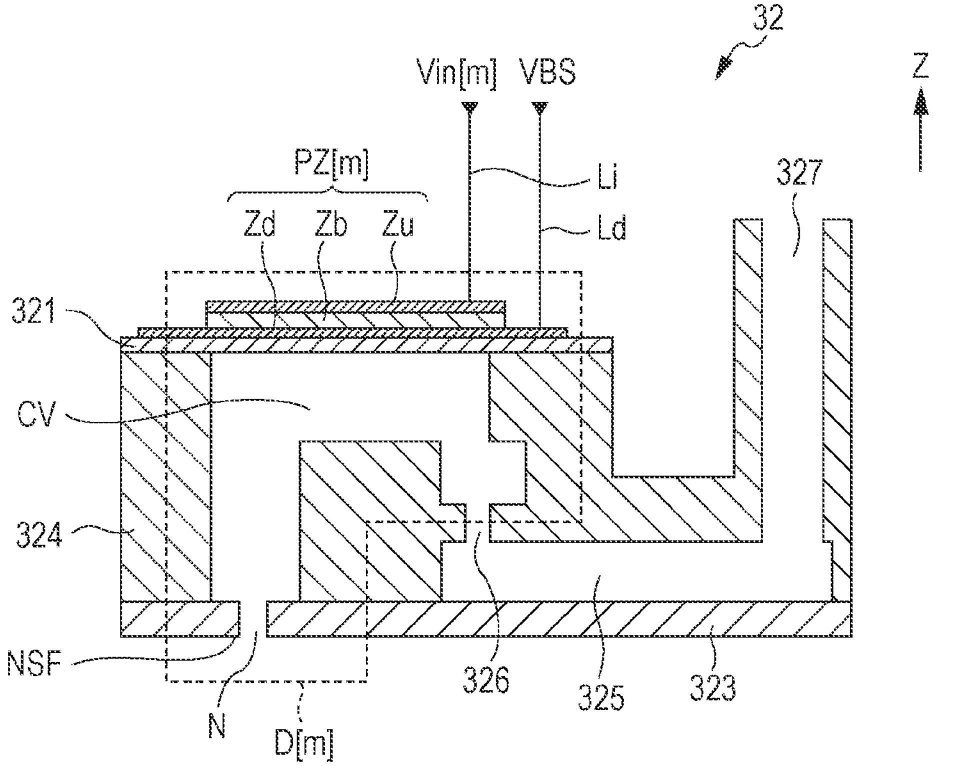
FIG. 3 is a cross-sectional view for explaining an example of a structure of an ejecting portion.

FIG. 3 is a cross-sectional view for explaining an example of a structure of the ejecting portion D. In FIG. 3, a cross section of a part of the recording head 32 is schematically illustrated under an assumption that the recording head 32 is cut along a plane including the ejecting portion D[m].

The ejecting portion D[m] includes a piezoelectric element PZ[m], a cavity CV, the inside of which is to be filled with ink, the nozzle N, which is in communication with the cavity CV, and a diaphragm 321. The ejecting portion D[m] ejects ink present inside the cavity CV through the nozzle N when the piezoelectric element PZ[m] is driven by means of the individual drive signal Vin[m]. The cavity CV is an example of a "pressure compartment". The piezoelectric element PZ[m] is an example of a "drive element".

The cavity CV is a space demarcated by a cavity plate 324, a nozzle plate 323, which has the nozzle N formed through itself, and the diaphragm 321. The cavity CV is in communication with a reservoir 325 through an ink supply port 326. The reservoir 325 is in communication with the ink cartridge 120 corresponding to the ejecting portion D[m] through an ink inlet port 327.

The piezoelectric element PZ[m] causes pressure changes in ink present inside the cavity CV in accordance with the individual drive signal Vin[m]. For example, the piezoelectric element PZ[m] includes an upper electrode Zu[m], a lower electrode Zd[m], and a piezoelectric substance Zb[m], which is provided between the upper electrode Zu[m] and the lower electrode Zd[m]. The upper electrode Zu[m] is electrically coupled to a wiring line Li, to which the individual drive signal Vin[m] is supplied. The lower electrode Zd[m] is electrically coupled to a wiring line Ld, to which a bias voltage signal VBS is supplied. A voltage is applied between the upper electrode Zu[m] and the lower electrode Zd[m] when the individual drive signal Vin[m] is supplied to the upper electrode Zu[m]. The piezoelectric element PZ[m] becomes displaced in the +Z direction or the −Z direction in accordance with the voltage applied between the upper electrode Zu[m] and the lower electrode Zd[m].

As described above, the piezoelectric element PZ[m] vibrates in accordance with the voltage applied between the upper electrode Zu[m] and the lower electrode Zd[m]. The lower electrode Zd[m] is bonded to the diaphragm 321. Therefore, when the piezoelectric element PZ[m] driven by means of the individual drive signal Vin[m] vibrates, the diaphragm 321 also vibrates. The vibration of the diaphragm 321 causes a change in the capacity of the cavity CV and a change in the internal pressure of the cavity CV. As a result, the ink, with which the inside of the cavity CV is filled, is ejected through the nozzle N.

In the present embodiment, for the purpose of giving an example, it is assumed that the piezoelectric element PZ becomes displaced in the −Z direction due to a change in the potential of the individual drive signal Vin[m] supplied to the ejecting portion D[m] from a low level to a high level. That is, in the present embodiment, it is assumed that the capacity of the cavity CV of the ejecting portion D[m] is smaller when the potential of the individual drive signal Vin[m] supplied to the ejecting portion D[m] is in a high level than when in a low level. In addition, in the present embodiment, the −Z-side surface of the nozzle plate 323, namely, the surface oriented in the direction in which the ink is ejected, will be referred to also as a nozzle surface NSF.

Next, with reference to FIG. 4, a layout example of the nozzles N will now be described.

Figure 4:
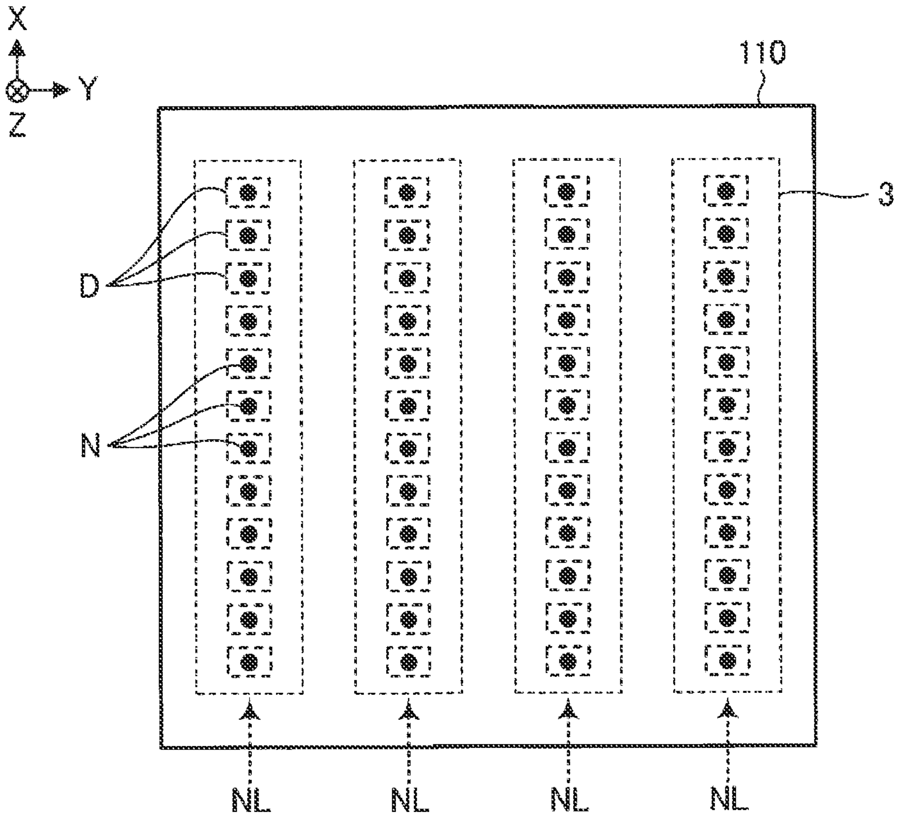
FIG. 4 is a plan view illustrating a layout example of nozzles of head units.

FIG. 4 is a plan view illustrating a layout example of the nozzles N of the head units 3. In FIG. 4, together with four head units 3 mounted on the carriage 110, a layout example of the nozzles N (the number of which is 4M in total) provided on these four head units 3 in a plan view of the ink-jet printer 1 from the −Z directional side is illustrated.

A nozzle row NL is provided on each of the head units 3 provided on the carriage 110. The nozzle row NL is a plurality of nozzles N arranged in a line extending in a predetermined direction. In the present embodiment, a case where each of the nozzle rows NL is made up of an M number of nozzles N arranged in the X direction is assumed as an example.

Next, with reference to FIGS. 5 and 6, an overview of the head unit 3 will be given below.

FIG. 5 is a block diagram illustrating an example of a configuration of the head unit 3.

As described earlier with reference to FIG. 1, the head unit 3 includes the supply circuit 31 and the recording head 32. The recording head 32 includes a wiring line La, via which the drive signal COM is supplied from the drive signal generation unit 4, and a wiring line Li[m], via which the individual drive signal Vin[m] is supplied to the ejecting portion D[m].

The supply circuit 31 includes an M number of switches Wa[1] to Wa[M] corresponding to the M number of the ejecting portions D[1] to D[M] on a one-to-one correspondence basis. The supply circuit 31 further includes a coupling state specifying circuit 310. The coupling state specifying circuit 310 specifies a coupling state of each of the M number of switches Wa. For example, based on at least a part of signals including the print signal SI and a latch signal LAT supplied from the control unit 2, the coupling state specifying circuit 310 generates a coupling state specifying signal Qa[m] for specifying ON/OFF of the switch Wa[m].

Based on the coupling state specifying signal Qa[m], the switch Wa[m] switches a conduction between the wiring line La and the upper electrode Zu[m] of the piezoelectric element PZ[m] provided in the ejecting portion D[m] between a conductive state and a non-conductive state. That is, based on the coupling state specifying signal Qa[m], the switch Wa[m] switches the conduction between the wiring line La and the wiring line Li[m] leading to the upper electrode Zu[m] between a conductive state and a non-conductive state. In the present embodiment, the switch Wa[m] is ON when the coupling state specifying signal Qa[m] is in a high level, and the switch Wa[m] is OFF when the coupling state specifying signal Qa[m] is in a low level. When the switch Wa[m] is ON, the drive signal COM supplied to the wiring line La is supplied to the upper electrode Zu[m] of the ejecting portion D[m] through the wiring line Li[m] as the individual drive signal Vin[m].

Next, with reference to FIG. 6, operation of the head unit 3 will now be described.

In the present embodiment, when the ink-jet printer 1 performs print processing or flushing processing, a single unit period TP, or a plurality of unit periods TP, is set as an operation period of the ink-jet printer 1. The ink-jet printer 1 according to the present embodiment is capable of driving each ejecting portion D[m] in each unit period TP for the purpose of print processing or flushing processing.

Figure 6:
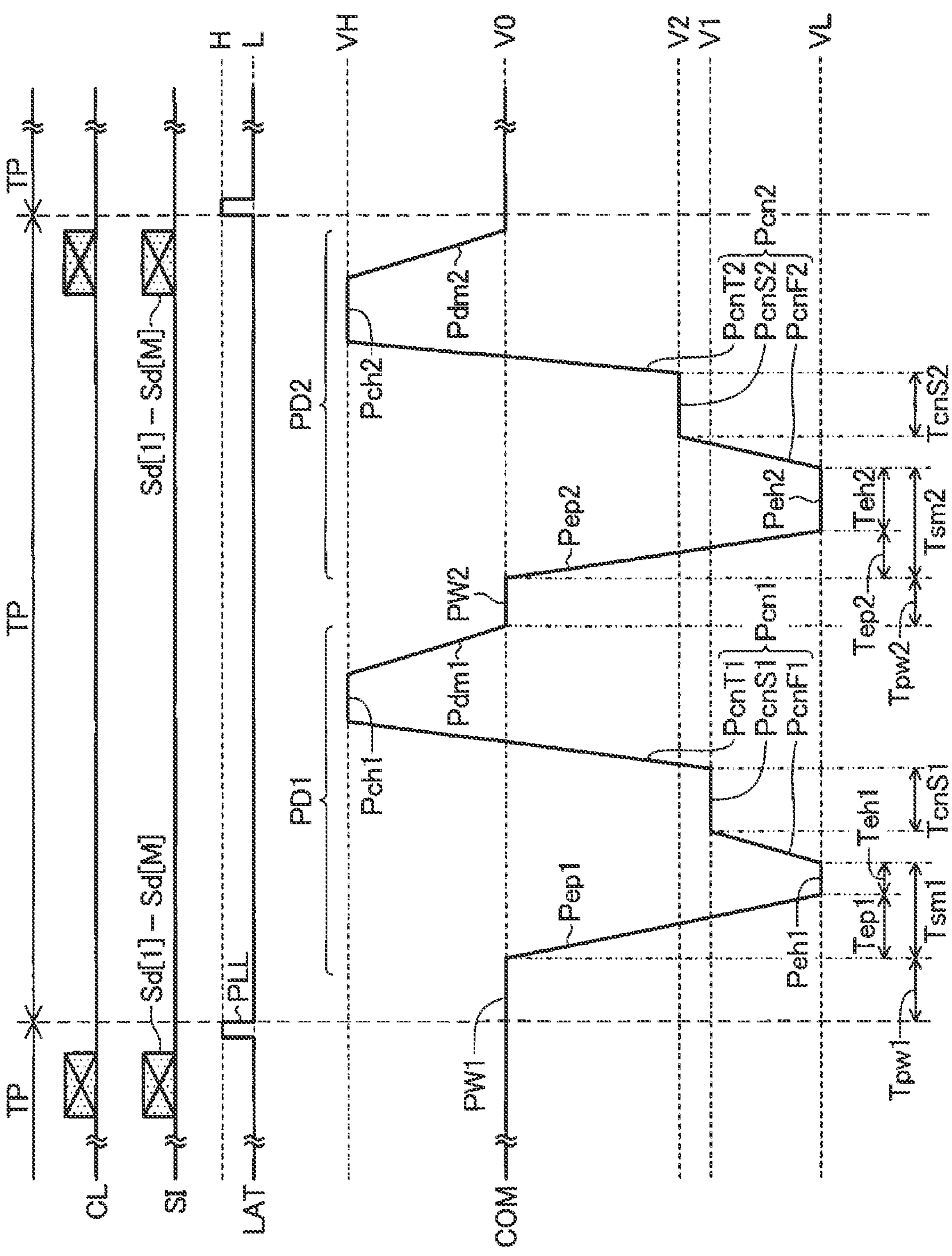
FIG. 6 is a timing chart for explaining an example of signals supplied to the head unit.

FIG. 6 is a timing chart for explaining an example of signals supplied to the head unit 3.

The control unit 2 outputs a latch signal LAT having pulses PLL. By means of this pulsed signal, the control unit 2 defines the unit period TP as a period from the rising of a certain pulse PLL to the rising of the next pulse PLL. The unit period TP is a period for, for example, forming one dot corresponding to each nozzle N on the recording paper P. In the present embodiment, it is assumed that two ink droplets are ejected from the nozzle N within the same unit period TP, and these two ink droplets merge together before landing onto a surface of the recording paper P, thereby forming a single dot on the recording paper P. The unit period TP is, for example, a drive cycle for the M number of the ejecting portions D. In the present embodiment, it is assumed that a cycle of the drive signal COM corresponds to the unit period TP.

The print signal SI according to the present embodiment includes an M number of individual specifying signals Sd[1] to Sd[M] corresponding to the M number of the ejecting portions D[1] to D[M] on a one-to-one correspondence basis. The individual specifying signals Sd[m] specifies the behavior of the ejecting portion D[m] in each unit period TP when the ink-jet printer 1 performs print processing or flushing processing. For example, prior to each unit period TP, the control unit 2 supplies the print signal SI including the M number of individual specifying signals Sd[1] to Sd[M] to the coupling state specifying circuit 310 in synchronization with a clock signal CL. Then, based on the individual specifying signals Sd[m], in the unit period TP, the coupling state specifying circuit 310 generates the coupling state specifying signal Qa[m]. As described here, the control unit 2 controls the supply of the drive signal COM to each of the M number of piezoelectric elements PZ by supplying the print signal SI including the M number of individual specifying signals Sd[1] to Sd[M] to the coupling state specifying circuit 310.

For example, by means of the individual specifying signals Sd[m], the ejecting portion D[m] is designated as either the ejecting portion D that forms a dot or the ejecting portion D that does not form a dot in the unit period TP1 in which print processing is performed.

The drive signal COM includes a waveform PD1 and a waveform PD2, which are adjacent to each other in a time series. In the example illustrated in FIG. 6, the waveform PD2 is a waveform posterior to the waveform PD1. That is, the drive signal COM includes the waveform PD1 and the waveform PD2, which is posterior to the waveform PD1. The drive signal COM further includes a waveform PW1 and a waveform PW2. Along the waveform PW1, the potential of the drive signal COM is kept at a level V0, which is a level at the time of start of the waveform PD1, before the waveform PD1 starts. The waveform PW2 is continuous from the waveform PD1 and continuous to the waveform PD2. Along the waveform PW2, the potential of the drive signal COM is kept at the level V0, which is a level at the time of start of the waveform PD2. As described here, for example, the drive signal COM includes a pulse of the waveform PD1 and a pulse of the waveform PD2 that are provided in the unit period TP.

The waveform PD1 and the waveform PD2 constitute an example of a "plurality of drive waveforms". Therefore, the waveform PD1 is an example of a "second-to-last drive waveform", and the waveform PD2 is an example of a "last drive waveform". Therefore, the waveform PD1 is an example of a "first drive waveform", and the waveform PD2 is an example of a "second drive waveform". The waveform PW1 is an example of a "first wait waveform", and the waveform PW2 is an example of a "second wait waveform". In the description below, the waveform PD1 and the waveform PD2 will be referred to also as a waveform PD without making a distinction therebetween. Similarly, the waveform PW1 and the waveform PW2 will be referred to also as a waveform PW.

As will be described in detail later, the waveform PD1 and the waveform PD2 are waveforms for ejecting ink droplets from the nozzle N. For example, a first ink droplet ejected from the nozzle N due to being driven by the waveform PD1 and a second ink droplet ejected from the nozzle N due to being driven by the waveform PD2 within the same unit period TP merge together before landing onto a surface of the recording paper P. The first ink droplet is an example of a "first liquid droplet". The second ink droplet is an example of a "second liquid droplet". In the description below, the first ink droplet will be referred to also as the first one of ink droplets, and the second ink droplet will be referred to also as the second one of ink droplets. First, the waveform PD1 will now be explained.

The waveform PD1 is a waveform specifying that, for example, the potential of the drive signal COM changes from the level V0 to a level VL, next to a level V1, next to a level VH, and then returns to the level V0. The level V0 is, for example, a reference potential. The level VL is a level lower than the level V0, and is the lowest level of the waveform PD1. The level VH is a level higher than the level V0, and is the highest level of the waveform PD1. The level V1 is a level between the level V0 and level VL. The level VL is an example of a "first level". The level VH is an example of a "second level". The level V1 is an example of a "first intermediate level". Each of the level VL, the level VH, the level V1, the level V0, and a level V2 to be described later is determined based on, for example, the characteristics of ink ejection by the ejecting portion D. Examples of the ink-ejection characteristics are: an amount of ink ejected as an ink droplet, a speed of the ejected ink droplet, and the like.

In the description below, of the waveform PD1, a portion where the potential of the drive signal COM changes from the level V0 to the level VL will be referred to also as a waveform Pep1, and a portion where the potential of the drive signal COM is kept at the level VL will be referred to also as a waveform Peh1. Of the waveform PD1, a portion where the potential of the drive signal COM changes from the level VL to the level VH will be referred to also as a waveform Pcn1, and a portion where the potential of the drive signal COM is kept at the level VH will be referred to also as a waveform Pch1. Of the waveform PD1, a portion where the potential of the drive signal COM changes from the level VH to the level V0 will be referred to also as a waveform Pdm1. That is, the waveform PD1 includes the waveforms Pep1, Peh1, Pcn1, Pch1, and Pdm1.

The waveform Pep1 is a waveform for causing a displacement of the piezoelectric element PZ in the +Z direction. That is, the waveform Pep1 is a waveform along which the potential of the drive signal COM changes so as to cause the capacity of the cavity CV to expand. Therefore, among a plurality of elements making up the pulse of the waveform PD1, the waveform Pep1 corresponds to an expansion element for changing the potential of the drive signal COM in order to drive the piezoelectric element PZ such that the capacity of the cavity CV will expand. When the capacity of the cavity CV expands, the surface of ink present inside the nozzle N is sucked inward in the +Z direction, which is the opposite of the ejecting direction. In the description below, sucking the surface of ink present inside the nozzle N inward in the direction that is the opposite of the ejecting direction may be referred to as "pull", where appropriate. The waveform Pep1 is an example of a "first expansion waveform".

The waveform Peh1 is a waveform for keeping the position of the piezoelectric element PZ in the Z direction. For example, among the plurality of elements making up the pulse of the waveform PD1, the waveform Peh1 corresponds to an expansion maintaining element for maintaining the potential of the drive signal COM in order to drive the piezoelectric element PZ such that the capacity of the cavity CV having been expanded by the waveform Pep1 will be maintained. In the example illustrated in FIG. 6, the waveform Peh1 is continuous from the waveform Pep1 and continuous to the waveform Pcn1 and keeps the potential of the drive signal COM at the level VL, which is a level at the time of end of the waveform Pep1. The waveform Peh1 is an example of a "first expansion maintaining waveform".

The waveform Pcn1 is a waveform for causing a displacement of the piezoelectric element PZ in the −Z direction. That is, the waveform Pcn1 is a waveform along which the potential of the drive signal COM changes so as to cause the capacity of the cavity CV to contract. Therefore, among the plurality of elements making up the pulse of the waveform PD1, the waveform Pcn1 corresponds to a contraction element for changing the potential of the drive signal COM in order to drive the piezoelectric element PZ such that the capacity of the cavity CV will contract. When the capacity of the cavity CV contracts, the surface of ink present inside the nozzle N is pushed outward in the −Z direction, which is the ejecting direction. In the description below, pushing the surface of ink present inside the nozzle N outward in the ejecting direction may be referred to as "push", where appropriate.

The waveform Pcn1 includes a waveform PcnF1, along which the potential of the drive signal COM changes from the level VL to the level V1, a waveform PcnS1, along which the potential of the drive signal COM is kept at the level V1, and a waveform PcnT1, along which the potential of the drive signal COM changes from the level V1 to the level VH. Therefore, in the waveform Pcn1, contraction of the capacity of the cavity CV is performed in two steps. The waveform Pcn1 is an example of a "first contraction waveform". The waveform PcnF1 is an example of a "first segment waveform". The waveform PcnS1 is an example of a "second segment waveform". The waveform PcnT1 is an example of a "third segment waveform".

In the present embodiment, as described earlier with reference to FIG. 3, it is assumed that the capacity of the cavity CV of the ejecting portion D[m] is smaller when the potential of the individual drive signal Vin[m] is in a high level than when in a low level. Therefore, when the drive signal COM is supplied as the individual drive signal Vin[m] to the ejecting portion D[m], some part of ink present inside the ejecting portion D[m] is ejected as the first one of ink droplets from the nozzle N due to being driven by the waveform Pcn1, along which the potential of the individual drive signal Vin[m] changes from a low level to a high level.

In the present embodiment, as described above, because of the shape of the waveform Pcn1, contraction of the capacity of the cavity CV is performed in two steps. In the description below, among waveforms corresponding to a contraction element, a waveform along which contraction of the capacity of the cavity CV is performed in two steps will be referred to also as a two-step push waveform. In the description below, among waveforms corresponding to a contraction element, a waveform along which contraction of the capacity of the cavity CV is performed in a single step without separation into multiple steps may be referred to as a simple push waveform, where appropriate, in contrast to a two-step push waveform.

In the present embodiment, since the waveform Pcn1 is a two-step push waveform, an amount of ink droplet ejected in a first-step push due to being driven by the waveform PcnF1 is smaller than an amount of ink droplet ejected due to being driven by a simple push waveform. Therefore, in the present embodiment, among ink droplets, the speed of a main droplet forming a dot is lower than the speed of an ink droplet ejected due to being driven by a simple push waveform. Moreover, in the present embodiment, since the potential of the drive signal COM is kept by the waveform PcnS1 at the level at the time of end of the waveform PcnF1, a constriction will be formed in a satellite droplet following the main droplet among the ink droplets. Then, for example, the satellite droplet becomes separated from the ink present inside the nozzle N by a second-step push due to being driven by the waveform PcnT1. Moreover, the second-step push increases the speed of the satellite droplet. This makes it easier for the satellite droplet to merge with the main droplet; therefore, a part of the satellite droplet is absorbed into the main droplet. As a result, the present embodiment makes it possible to increase the size of the main droplet and decrease the size of the satellite droplet.

The waveform Pch1 is a waveform for keeping the position of the piezoelectric element PZ in the Z direction. For example, among the plurality of elements making up the pulse of the waveform PD1, the waveform Pch1 corresponds to a contraction maintaining element for maintaining the potential of the drive signal COM in order to drive the piezoelectric element PZ such that the capacity of the cavity CV having been contracted by the waveform Pcn1 will be maintained. In the example illustrated in FIG. 6, the waveform Pch1 is a waveform along which the potential of the drive signal COM is kept at the level VH, which is a level at the time of end of the waveform Pcn1. The waveform Pch1 is an example of a "first contraction maintaining waveform".

The waveform Pdm1 is a waveform for causing a displacement of the piezoelectric element PZ in the +Z direction. For example, the waveform Pdm1 is a waveform along which the potential of the drive signal COM changes so as to attenuate residual vibration of ink inside the cavity CV by causing the capacity of the cavity CV having been contracted by the waveform Pcn1 to expand. That is, the waveform Pdm1 is a waveform along which the potential of the drive signal COM changes from the level VH to the level V0 so as to attenuate residual vibration of ink inside the cavity CV by causing the capacity of the cavity CV having been maintained by the waveform Pch1 to expand. Therefore, among the plurality of elements making up the pulse of the waveform PD1, the waveform Pdm1 corresponds to a vibration damping element for changing the potential of the drive signal COM in order to drive the piezoelectric element PZ such that residual vibration of ink inside the cavity CV will be attenuated by expansion of the capacity of the cavity CV. The waveform Pdm1 is an example of a "first vibration damping waveform".

For example, at a timing that corresponds to the length of the waveform Pch1, vibration of ink inside the cavity CV that has occurred before the end of the waveform Pcn1 is combined with vibration that is generated by the waveform Pdm1. That is, the piezoelectric element PZ[m] attenuates the vibration of ink inside the cavity CV by causing the capacity of the cavity CV to expand in accordance with a potential change caused by the waveform Pdm1. As described here, the waveform PD1 is a so-called pull-push-pull waveform.

Next, the waveform PD2 will now be explained. The waveform PD2 is also a pull-push-pull waveform, similarly to the waveform PD1. A detailed explanation of the same elements as those of the waveform PD1 will not be given below.

The waveform PD2 is a waveform specifying that, for example, the potential of the drive signal COM changes from the level V0 to the level VL, next to the level V2, next to the level VH, and then returns to the level V0. The level V2 is a level between the level V0 and level VL. For example, the level V1 and the level V2 are determined such that the speed of the second ink droplet ejected from the nozzle N due to being driven by the waveform PD2 will be higher than the speed of the first ink droplet ejected from the nozzle N due to being driven by the waveform PD1. The level V2 is an example of a "second intermediate level".

In the description below, of the waveform PD2, a portion where the potential of the drive signal COM changes from the level V0 to the level VL will be referred to also as a waveform Pep2, and a portion where the potential of the drive signal COM is kept at the level VL will be referred to also as a waveform Peh2. Of the waveform PD2, a portion where the potential of the drive signal COM changes from the level VL to the level VH will be referred to also as a waveform Pcn2, and a portion where the potential of the drive signal COM is kept at the level VH will be referred to also as a waveform Pch2. Of the waveform PD2, a portion where the potential of the drive signal COM changes from the level VH to the level V0 will be referred to also as a waveform Pdm2. That is, the waveform PD2 includes the waveforms Pep2, Peh2, Pcn2, Pch2, and Pdm2. The waveform Pcn2 includes a waveform PcnF2, along which the potential of the drive signal COM changes from the level VL to the level V2, a waveform PcnS2, along which the potential of the drive signal COM is kept at the level V2, and a waveform PcnT2, along which the potential of the drive signal COM changes from the level V2 to the level VH.

Except for a potential change amount of the waveform PcnF2, etc., the waveform PD2 is similar to the waveform PD1. For example, the waveform Pcn2 is a waveform along which the potential of the drive signal COM changes so as to eject an ink droplet from the nozzle N by causing the capacity of the cavity CV having been expanded by the waveform Pep2 to contract. The waveform Pcn2 corresponds to a contraction element that is similar to the waveform Pcn1. Therefore, when the drive signal COM is supplied as the individual drive signal Vin[m] to the ejecting portion D[m], some part of ink present inside the ejecting portion D[m] is ejected as the second one of ink droplets from the nozzle N due to being driven by the waveform Pcn2, along which the potential of the individual drive signal Vin[m] changes from a low level to a high level.

The waveform Pep2 corresponds to an expansion element that is similar to the waveform Pep1. The waveform Peh2 corresponds to an expansion maintaining element that is similar to the waveform Peh1. The waveform Pch2 corresponds to a contraction maintaining element that is similar to the waveform Pch1. The waveform Pdm2 corresponds to a vibration damping element that is similar to the waveform Pdm1. The waveform Pep2 is an example of a "second expansion waveform". The waveform Peh2 is an example of a "second expansion maintaining waveform". The waveform Pcn2 is an example of a "second contraction waveform". The waveform PcnF2 is an example of a "fourth segment waveform". The waveform PcnS2 is an example of a "fifth segment waveform". The waveform PcnT2 is an example of a "sixth segment waveform". The waveform Pch2 is an example of a "second contraction maintaining waveform". The waveform Pdm2 is an example of a "second vibration damping waveform".

In the description below, the waveform Pep1 and the waveform Pep2 will be referred to also as a waveform Pep without making a distinction therebetween. Similarly, the waveform Peh1 and the waveform Peh2 will be referred to also as a waveform Peh, and the waveform Pcn1 and the waveform Pcn2 will be referred to also as a waveform Pcn. The waveform Pch1 and the waveform Pch2 will be referred to also as a waveform Pch, and the waveform Pdm1 and the waveform Pdm2 will be referred to also as a waveform Pdm. The waveform PcnF1 and the waveform PcnF2 will be referred to also as a waveform PcnF, the waveform PcnS1 and the waveform PcnS2 will be referred to also as a waveform PcnS, and the waveform PcnT1 and the waveform PcnT2 will be referred to also as a waveform PcnT.

In the present embodiment, each element of the waveform PD1 and the waveform PD2 is determined such that the speed of the second one of ink droplets, namely, the second ink droplet ejected due to being driven by the waveform PD2, will be higher than the speed of the first one of ink droplets, namely, the first ink droplet ejected due to being driven by the waveform PD1. This enables the second one of ink droplets to merge with the first one (having been ejected due to being driven by the waveform Pcn1) thereof before landing onto a surface of the recording paper P in the present embodiment. The description below will be given while focusing on setting conditions for making the speed of the second ink droplet ejected due to being driven by the waveform PD2 higher than the speed of the first ink droplet ejected due to being driven by the waveform PD1, among settings of the elements of the waveform PD1 and the waveform PD2 and settings of the waveforms PW.

A first setting condition is that a potential change amount of the waveform PcnF2 is larger than a potential change amount of the waveform PcnF1. For example, the level V2 at the time of end of the waveform PcnF2 is higher than the level V1 at the time of end of the waveform PcnF1. As described here, in the first setting condition, a potential change amount of the waveform PcnF applied when performing first-step contraction in contracting the capacity of the cavity CV in two steps, that is, a potential change amount of the waveform PcnF for ejecting an ink droplet from the nozzle N, is adjusted. When a potential change amount of the waveform PcnF for ejecting an ink droplet from the nozzle N is relatively large, the ejection speed of the ink droplet will be higher than when the potential change amount of the waveform PcnF is relatively small. Therefore, satisfying the first setting condition will make the speed of the second ink droplet ejected due to being driven by the waveform PD2 higher than the speed of the first ink droplet ejected due to being driven by the waveform PD1.

A second setting condition is that a potential change amount of the waveform PcnT1 per unit time is smaller than a potential change amount of the waveform PcnT2 per unit time. As described here, in the second setting condition, a potential change amount, per unit time, of the waveform PcnT applied when performing second-step contraction in contracting the capacity of the cavity CV in two steps, that is, a potential change amount of the waveform PcnT per unit time for separating an ink droplet from ink present inside the nozzle N, is adjusted. When a potential change amount of the waveform PcnT per unit time for separating an ink droplet from ink present inside the nozzle N is relatively small, the ejection speed of the ink droplet will be lower than when the potential change amount of the waveform PcnT per unit time is relatively large. Therefore, satisfying the second setting condition will make the speed of the second ink droplet ejected due to being driven by the waveform PD2 higher than the speed of the first ink droplet ejected due to being driven by the waveform PD1.

A third setting condition is that a difference between a period Tsm1, which is a period before ink ejection in the waveform PD1, and a period of one half of a natural vibration cycle of the ejecting portion D is larger than a difference between a period Tsm2, which is a period before ink ejection in the waveform PD2, and a period of one half of the natural vibration cycle of the ejecting portion D. For example, the period Tsm1 is a period from the start of the waveform Pep1 to the start of the waveform Pcn1. The period Tsm1 is equal to a sum of a period Tep1 of the waveform Pep1 and a period Teh1 of the waveform Peh1. The period Tsm2 is a period from the start of the waveform Pep2 to the start of the waveform Pcn2. The period Tsm2 is equal to a sum of a period Tep2 of the waveform Pep2 and a period Teh2 of the waveform Peh2. As described here, in the third setting condition, a relationship between the period Tsm1, which is equal to a sum of the period Tep1 of the waveform Pep1 and the period Teh1 of the waveform Peh1, the period Tsm2, which is equal to a sum of the period Tep2 of the waveform Pep2 and the period Teh2 of the waveform Peh2, and the natural vibration cycle of the ejecting portion D, is adjusted. In the description below, the period Tsm1 and the period Tsm2 will be referred to also as a period Tsm without making a distinction therebetween.

The natural vibration cycle of the ejecting portion D mentioned here is, for example, a natural vibration cycle that is representative of natural vibration cycles of the M number of the ejecting portions D. For example, the natural vibration cycle that is representative of the natural vibration cycles of the M number of the ejecting portions D may be the natural vibration cycle of one ejecting portion D among the M number of the ejecting portions D. Alternatively, the natural vibration cycle that is representative of the natural vibration cycles of the M number of the ejecting portions D may be an average of natural vibration cycles of an N number of the ejecting portions D, or a maximum value or a minimum value among the natural vibration cycles of the N number of the ejecting portions D. The value N is a natural number that satisfies "$2 \le N \le M$".

When the difference between the period Tsm, which is from the start of the waveform Pep to the start of the waveform Pcn, and the period of one half of the natural vibration cycle of the ejecting portion D is relatively small, the ejection speed of the ink droplet will be higher than when the difference between the period Tsm and the period of one half of the natural vibration cycle of the ejecting portion D is relatively large. Therefore, satisfying the third setting condition will make the speed of the second ink droplet ejected due to being driven by the waveform PD2 higher than the speed of the first ink droplet ejected due to being driven by the waveform PD1.

In the example illustrated in FIG. 6, the difference between the period Tsm and the period of one half of the natural vibration cycle of the ejecting portion D in the waveform PD1 is set to be larger than the difference between the period Tsm and the period of one half of the natural vibration cycle of the ejecting portion D in the waveform PD2 by setting the period Teh1 of the waveform Peh1 to be shorter than the period Teh2 of the waveform Peh2.

A fourth setting condition is that a period Tpw2 of the waveform PW2 is shorter than a period Tpw1 of the waveform PW1. A fifth setting condition is that the period Tpw2 of the waveform PW2 is not less than one-sixth but not greater than one-fifth of the natural vibration cycle of the ejecting portion D. The speed of the second one of ink droplets is adjusted by, for example, adjusting the period Tpw2 of the waveform PW2. Therefore, by satisfying either the fourth setting condition or the fifth setting condition or satisfying both the fourth setting condition and the fifth setting condition, it is possible to make the speed of the second ink droplet ejected due to being driven by the waveform PD2 higher than the speed of the first ink droplet ejected due to being driven by the waveform PD1.

A sixth setting condition is that a potential change amount of the waveform Pep2 per unit time is larger than a potential change amount of the waveform Pep1 per unit time. When a potential change amount of the waveform Pep corresponding to an expansion element per unit time is relatively large, the ejection speed of the ink droplet will be higher than when the potential change amount of the waveform Pep per unit time is relatively small. Therefore, satisfying the sixth setting condition will make the speed of the second ink droplet ejected due to being driven by the waveform PD2 higher than the speed of the first ink droplet ejected due to being driven by the waveform PD1.

The setting conditions for making the speed of the second ink droplet ejected due to being driven by the waveform PD2 higher than the speed of the first ink droplet ejected due to being driven by the waveform PD1 are not limited to the first to sixth setting conditions described above. For example, as a setting condition other than the above setting conditions, a potential change amount of the waveform Pep2 may be larger than a potential change amount of the waveform Pep1. Specifically, the level at the time of start of the waveform Pep2 may be higher than the level at the time of start of the waveform Pep1. In the present embodiment, all of the plurality of setting conditions described above may be adopted, or some of the plurality of setting conditions described above may be adopted.

Moreover, in the present embodiment, the waveforms PcnF, PcnS, and PcnT of each of the waveforms Pcn1 and Pcn2 are set such that the satellite droplet will be short in length. For example, a period TcnS1 of the waveform PcnS1 and a period TcnS2 of the waveform PcnS2 may have a length that is not less than one-fifth but not greater than one-fourth of the natural vibration cycle of the ejecting portion D. In the present embodiment, it is possible to adjust a time interval from the completion of the first-step push to the start of the second-step push by adjusting the length of the period TcnS1 and the period TcnS2. That is, in the present embodiment, by adjusting the length of the period TcnS1 and the period TcnS2, it is possible to execute the second-step push at a timing that will make the satellite droplet short.

Alternatively, the potential change amount of the waveform PcnF1 and the potential change amount of the waveform PcnF2 may be not greater than one-third of an amount of potential change from the level VL to the level VH. For example, in a simple push waveform, when a potential change amount is relatively large, the speed of an ink droplet will be higher than when a potential change amount is relatively small; however, in this case, a satellite droplet will be longer because a droplet tail continuous to ink will be longer. In this respect, the present embodiment makes it possible to make the satellite droplet short by making the potential change amount of the waveform PcnF corresponding to the first-step push waveform small. In the present embodiment, since the waveform Pcn is a two-step push waveform, it is possible to adjust the speed of an ink droplet into a desired speed by adjusting the waveform PcnT, which corresponds to the second-step push waveform.

As described above, in the present embodiment, it is possible to make a satellite droplet short and, therefore, it is possible to suppress mist generation. Consequently, in the present embodiment, it is possible to prevent a decrease in quality of a print image.

Next, with reference to FIG. 7, an action that occurs when the drive signal COM illustrated in FIG. 6 is supplied to the head unit 3 will now be explained.

Figure 7:
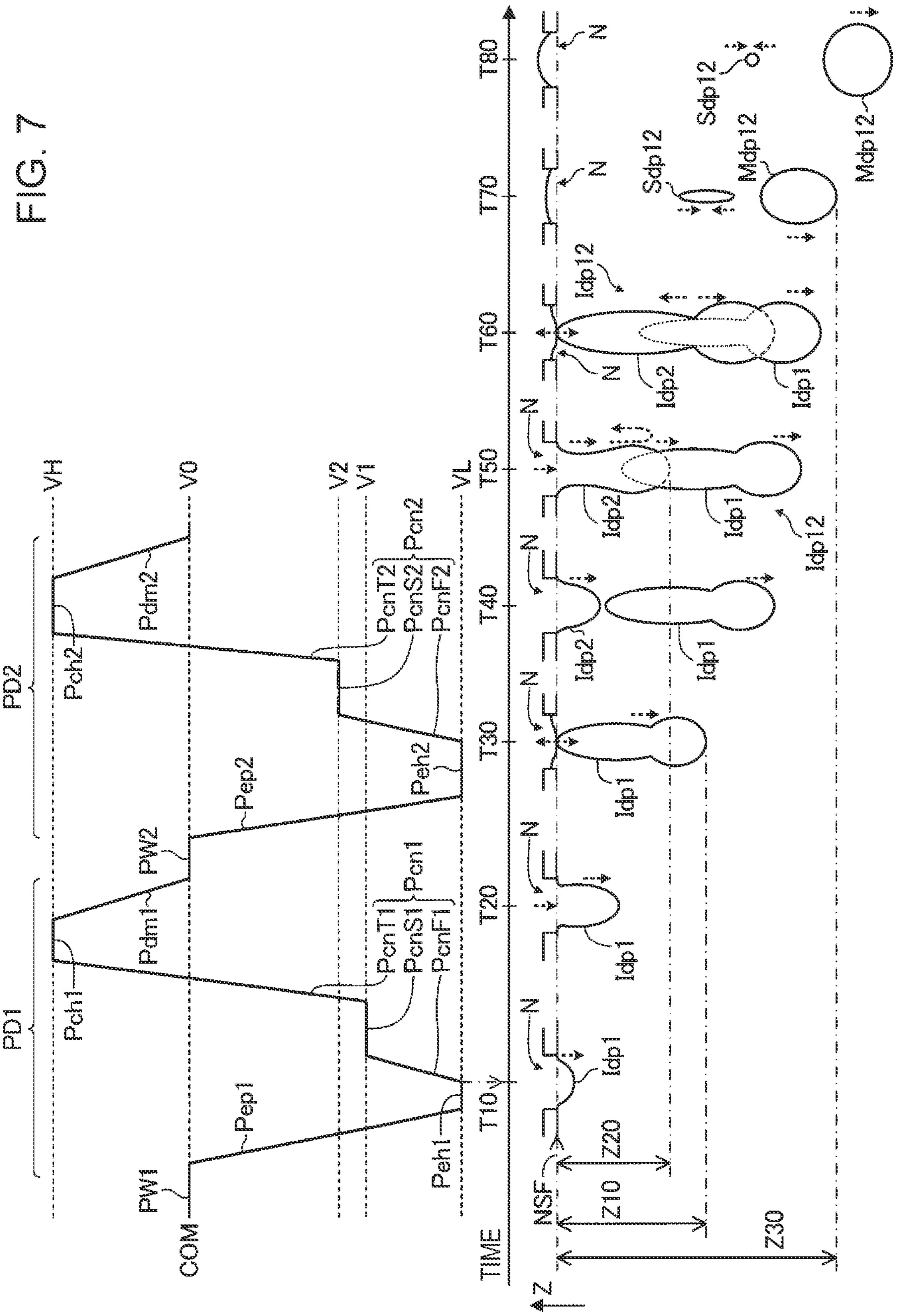
FIG. 7 is a diagram for explaining an action that occurs when a drive signal illustrated in FIG. 6 is supplied to the head unit.

FIG. 7 is a diagram for explaining an action that occurs when the drive signal COM illustrated in FIG. 6 is supplied to the head unit 3. FIG. 7 schematically depicts a process of merging of a first ink droplet Idp1 ejected from the nozzle N due to being driven by the waveform PD1 and a second ink droplet Idp2 ejected from the nozzle N due to being driven by the waveform PD2. Broken-line arrows in the figure indicate forces that are applied to ink droplets Idp1, Idp2, Idp12, and the like. The ink droplet Idp12 is an ink droplet formed as a result of merging of the first ink droplet Idp1 and the second ink droplet Idp2.

In the description below, the ink droplet Idp1, the ink droplet Idp2, the ink droplet Idp12, etc. will be referred to also as an ink droplet Idp without making a distinction therebetween. In the description below, of the superficial portion of the ink droplet Idp, an end portion in the −Z direction, namely, the ejecting direction, will be referred to also as a leading end of the ink droplet Idp, and an end portion in the +Z direction, namely, the direction that is the opposite of the ejecting direction, will be referred to also as a trailing end of the ink droplet Idp.

For example, at a point in time T10, applying of the waveform PcnF1 to the piezoelectric element PZ starts. Therefore, the first ink droplet Idp1 starts to be ejected from the nozzle N. At a point in time T20, the leading end of the first ink droplet Idp1 has moved in the −Z direction to a position that is on the −Z-directional side in comparison with the position of the leading end of the first ink droplet Idp1 at the point in time T10. It should be noted that, at the point in time T20, the first ink droplet Idp1 has not yet separated from the ink present inside the nozzle N.

At a point in time T30, the first ink droplet Idp1 becomes separated from the ink present inside the nozzle N. This means that the first ink droplet Idp1 becomes separated from the ink present inside the nozzle N before merging with the second ink droplet Idp2. Therefore, in the present embodiment, it is possible to reduce the influence of the first ink droplet Idp1 on an ejection amount of the second ink droplet Idp2 that follows the first ink droplet Idp1. Consequently, in the present embodiment, it is possible to adjust the amount of the second ink droplet Idp2 into a desired amount easily. Therefore, in the present embodiment, for example, it is possible to prevent the setting of the waveform PD2 for ejecting a desired amount of the second ink droplet Idp2 from being complex.

At a point in time T40, the leading end of the second ink droplet Idp2 is located on the −Z-directional side in comparison with the position of the nozzle surface NSF and is located on the +Z-directional side in comparison with the position of the trailing end of the first ink droplet Idp1. This means that, at the point in time T40, the second ink droplet Idp2 has not yet merged with the first ink droplet Idp1. In addition, at the point in time T40, the second ink droplet Idp2 has not yet separated from the ink present inside the nozzle N.

At a point in time T50, the leading end of the second ink droplet Idp2 becomes merged with the trailing end of the first ink droplet Idp1. Therefore, the ink droplet Idp12 is formed as a result of merging of the first ink droplet Idp1 and the second ink droplet Idp2. It should be noted that, at the point in time T50, the second ink droplet Idp2 has not yet separated from the ink present inside the nozzle N. This means that the second ink droplet Idp2 becomes merged with the first ink droplet Idp1 before becoming separated from the ink present inside the nozzle N.

In addition, at the point in time T50, the first ink droplet Idp1 has not split into a main droplet and a satellite droplet yet. That is, the first ink droplet Idp1, without splitting into a main droplet and a satellite droplet, merges with the second ink droplet Idp2. Suppose that, for example, after splitting of the first ink droplet Idp1 into a main droplet and a satellite droplet, the second ink droplet Idp2 merges with the satellite droplet of the first ink droplet Idp1. If this is the case, the speed of the second ink droplet Idp2 having merged with the satellite droplet of the first ink droplet Idp1 decreases. In this case, there is a possibility that the second ink droplet Idp2 might fail to catch up with the main droplet of the first ink droplet Idp1 before landing onto a surface of the recording paper P and thus fail to merge with the first ink droplet Idp1. By contrast, in the present embodiment, as described above, the first ink droplet Idp1 merges with the second ink droplet Idp2 without splitting into a main droplet and a satellite droplet. Therefore, in the present embodiment, it is possible to prevent a decrease in the speed of the second ink droplet Idp2 and ensure that the second ink droplet Idp2 will merge with the first ink droplet Idp1 before landing onto a surface of the recording paper P.

In addition, at the point in time T50, the second ink droplet Idp2 has not split into a main droplet and a satellite droplet yet. That is, the second ink droplet Idp2 merges with the first ink droplet Idp1 before splitting into a main droplet and a satellite droplet.

For example, at the point in time T50, due to contact of the leading end of the second ink droplet Idp2 with the first ink droplet Idp1, the speed of the leading-end portion of the second ink droplet Idp2 increases. Since the speed of the leading-end portion of the second ink droplet Idp2 increases, a reaction force is produced between the leading-end portion of the second ink droplet Idp2 and the trailing-end portion, namely, tail, of the second ink droplet Idp2. Due to the reaction force produced between the leading-end portion and the trailing-end portion of the second ink droplet Idp2, the speed of the tail portion of the second ink droplet Idp2 decreases. This makes it possible to prevent the tail portion from being long.

When the position of the leading end of the ink droplet Idp is focused on, the second ink droplet Idp2 merges with the first ink droplet Idp1 before traveling a distance that is twice as long as a distance Z10 from the nozzle surface NSF. The distance Z10 is a distance from the nozzle surface NSF to the leading end of the first ink droplet Idp1 at the point in time of separation of the first ink droplet Idp1 from the ink present inside the nozzle N. The distance that is twice as long as the distance Z10 is an example of a “first distance”. In the example illustrated in FIG. 7, a distance Z20 from the nozzle surface NSF to the leading end of the second ink droplet Idp2 at the point in time of merging of the first ink droplet Idp1 and the second ink droplet Idp2 is shorter than the distance Z10. That is, the second ink droplet Idp2 may merge with the first ink droplet Idp1 before traveling the distance Z10 from the nozzle surface NSF.

At a point in time T60, the second ink droplet Idp2 becomes separated from the ink present inside the nozzle N. That is, the ink droplet Idp12 formed as a result of merging of the first ink droplet Idp1 and the second ink droplet Idp2 becomes separated from the ink present inside the nozzle N. Due to the reaction force produced at the point in time T50, a +Z-directional force is applied to, of the tail portion, which is the trailing-end portion of the ink droplet Idp12, the portion that is close to the leading-end portion of the ink droplet Idp12.

Moreover, in the present embodiment, as described above, the leading end of the second ink droplet Idp2 merges with the first ink droplet Idp1 in a state in which the second ink droplet Idp2 is continuous to the ink present inside the nozzle N. For this reason, in the present embodiment, when the ink droplet Idp12 formed as a result of merging of the first ink droplet Idp1 and the second ink droplet Idp2 becomes separated from the ink present inside the nozzle N, the portion, of the ink droplet Idp12, cut from the ink present inside the nozzle N is pulled in the −Z direction. Therefore, a −Z-directional force is applied to, of the tail portion of the ink droplet Idp12, the portion that is close to the nozzle surface NSF. Consequently, the speed of the rear-end portion of the tail portion of the ink droplet Idp12 increases.

At a point in time T70, the ink droplet Idp12 splits into a main droplet Mdp12 and a satellite droplet Sdp12, which follows the main droplet Mdp12. That is, after the second ink droplet Idp2 merges with the first ink droplet Idp1, the ink droplet Idp12 formed as a result of merging of the first ink droplet Idp1 and the second ink droplet Idp2 splits into the main droplet Mdp12 and the satellite droplet Sdp12. A +Z-directional force is applied to the leading-end portion of the satellite droplet Sdp12 due to a reaction force produced between the main droplet Mdp12 and the satellite droplet Sdp12; therefore, the speed of the satellite droplet Sdp12 decreases. For this reason, for example, as illustrated at a point in time T80, it is possible to prevent the satellite droplet Sdp12 from being long.

When the position of the leading end of the ink droplet Idp is focused on, the ink droplet Idp12 formed as a result of merging of the first ink droplet Idp1 and the second ink droplet Idp2 may split into the main droplet Mdp12 and the satellite droplet Sdp12 before traveling a predetermined distance from the nozzle surface NSF. In the example illustrated in FIG. 7, a distance Z30 from the nozzle surface NSF to the leading end of the ink droplet Idp12 at the point in time of splitting of the ink droplet Idp12 into the main droplet Mdp12 and the satellite droplet Sdp12 is shorter than a distance that is twice as long as the distance Z10. That is, the predetermined distance may be a distance that is twice as long as the distance Z10.

As described above, in the present embodiment, due to supply of the drive signal COM, the piezoelectric element PZ operates to cause ejection of the first ink droplet Idp1 from the nozzle N in accordance with the waveform PD1. In addition, the piezoelectric element PZ operates to cause ejection of the second ink droplet Idp2 from the nozzle N in accordance with the waveform PD2 such that the second ink droplet Idp2 will merge with the first ink droplet Idp1 before the first ink droplet Idp1 lands onto a surface of the recording paper P. In the example illustrated in FIG. 7, the piezoelectric element PZ operates to cause ejection of the second ink droplet Idp2 from the nozzle N in accordance with the waveform PD2 such that the second ink droplet Idp2 will merge with the first ink droplet Idp1 before the second ink droplet Idp2 splits into a main droplet and a satellite droplet that follows the main droplet.

In the present embodiment, by supplying the drive signal COM including the two waveforms PD1 and PD2 each including a two-step push waveform to the piezoelectric element PZ, it is possible to prevent the satellite droplet Sdp12 from being long while forming a desired amount of the main droplet Mdp12.

In the present embodiment, the supply of the waveform Pep2, which corresponds to the expansion element among the elements of the waveform PD2, to the piezoelectric element PZ may be started at a point time that is within a period from the supply of the waveform PD1 to the piezoelectric element PZ to the point in time T30, at which the first ink droplet Idp1 becomes separated from the ink present inside the nozzle N. Also in this case, it is possible to prevent the satellite droplet Sdp12 from being long.

Next, with reference to FIG. 8, an experimental result of measurement of the length of a satellite droplet will now be explained.

Figure 8:
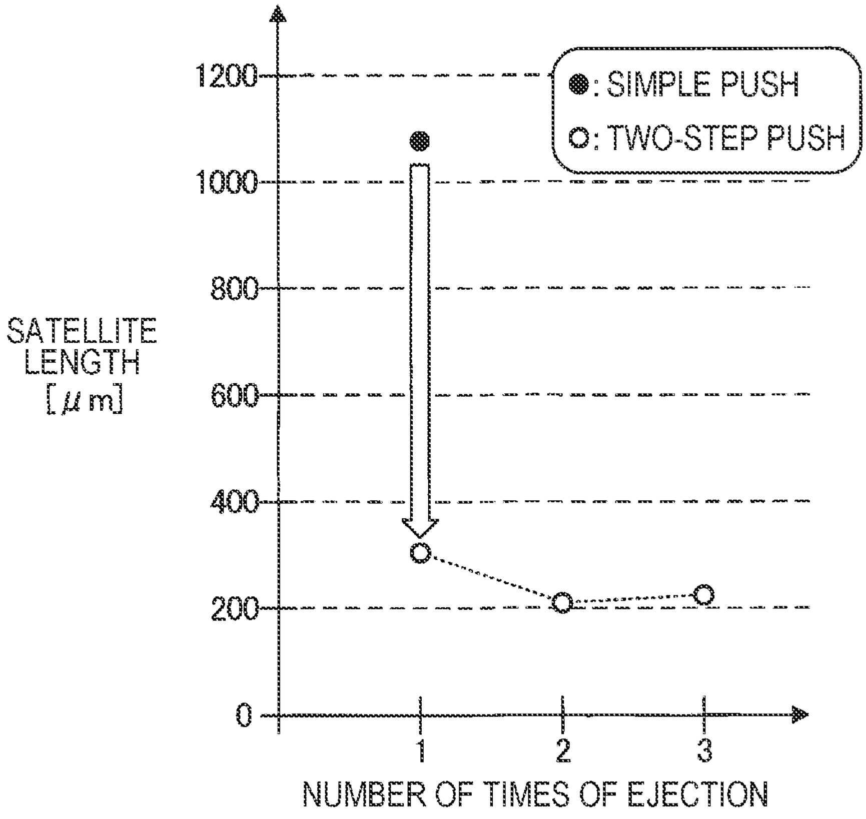
FIG. 8 is a diagram for explaining an experimental result of measurement of the length of a satellite droplet.

FIG. 8 is a diagram for explaining an experimental result of measurement of the length of a satellite droplet. FIG. 8 illustrates the result of an ink ejection experiment for a case where a viscosity of ink present inside the nozzle N that was measured at a shear rate 200 [1/sec.] is not less than 100 millipascal seconds. The vertical axis of FIG. 8 represents the length of a satellite droplet. The horizontal axis of FIG. 8 represents the number of times of ink ejection in the unit period TP. Each empty circle in the figure shows the length of a satellite droplet obtained when the piezoelectric element PZ is driven using the waveform PD including a two-step push waveform. The filled circle in the figure shows the length of a satellite droplet obtained when the piezoelectric element PZ is driven using a simple push waveform in contrast to a two-step push waveform. As described earlier with reference to FIG. 6, the simple push waveform is a waveform along which contraction of the capacity of the cavity CV is performed in a single step without separation into multiple steps.

When ink having a high viscosity is ejected using a simple push waveform, as compared with a case where ink having a low viscosity is ejected using a simple push waveform, it is necessary to make a potential change amount of the waveform Pcn for ejecting ink at a predetermined speed larger. When a potential change amount of the waveform Pcn is large, as compared with a case where a potential change amount of the waveform Pcn is small, ink will form a longer tail, resulting in an increase in the length of a satellite droplet. For example, as illustrated in FIG. 8, when the piezoelectric element PZ is driven using a simple push waveform such that ink ejection will be performed once in the unit period TP, the length of a satellite droplet is approximately 1,100 [μm].

By contrast, when the piezoelectric element PZ is driven using the waveform PD including a two-step push waveform such that ink ejection will be performed once in the unit period TP, the length of a satellite droplet is approximately 300 [μm]. That is, as compared with a case where a simple push waveform is used, using a two-step push waveform makes it possible to reduce the length of a satellite droplet by approximately 800 [μm].

When the piezoelectric element PZ is driven using the waveform PD including a two-step push waveform such that ink ejection will be performed twice in the unit period TP, the length of a satellite droplet is approximately 200 [μm]. The length of a satellite droplet is approximately 200 [μm]

also when the piezoelectric element PZ is driven using the waveform PD including a two-step push waveform such that ink ejection will be performed three times in the unit period TP. As the result of the experiment shows, in the present embodiment, also when the number of times of ink ejection in the unit period TP is increased, it is possible to prevent the satellite droplet Sdp12 from being long by driving the piezoelectric element PZ using the waveform PD including a two-step push waveform.

As described here, in the present embodiment, also when the viscosity of ink present inside the nozzle N is high, for example, also when the viscosity of the ink is not less than 10 millipascal seconds, it is possible to prevent the satellite droplet Sdp12 from being long. As described above, FIG. 8 illustrates the result of measurement of the length of a satellite droplet for a case where ink having a viscosity that is not less than 100 millipascal seconds is ejected. That is, in the present embodiment, even when the viscosity of ink present inside the nozzle N is not less than 100 millipascal seconds, it is possible to prevent a satellite droplet from being long.

As described above, in the present embodiment, the ink-jet printer 1 includes the head unit 3 and the control unit 2. The head unit 3 includes the ejecting portion D. The ejecting portion D includes the nozzle N, from which ink is ejected, the cavity CV, which is in communication with the nozzle N, and the piezoelectric element PZ, which causes pressure changes in ink present inside the cavity CV in accordance with the drive signal COM. The control unit 2 controls the supply of the drive signal COM to the piezoelectric element PZ. That is, the drive signal COM includes the waveform PD1 and the waveform PD2, which is a waveform posterior to the waveform PD1.

In the present embodiment, due to supply of the drive signal COM, the piezoelectric element PZ operates to cause ejection of the first ink droplet Idp1 from the nozzle N in accordance with the waveform PD1. In addition, the piezoelectric element PZ operates to cause ejection of the second ink droplet Idp2 from the nozzle N in accordance with the waveform PD2 such that the second ink droplet Idp2 will merge with the first ink droplet Idp1 before the first ink droplet Idp1 lands onto a surface of the recording paper P. For example, in the present embodiment, the piezoelectric element PZ operates to cause ejection of the second ink droplet Idp2 from the nozzle N in accordance with the waveform PD2 such that the second ink droplet Idp2 will merge with the first ink droplet Idp1 before the second ink droplet Idp2 ejected from the nozzle N splits into a main droplet and a satellite droplet that follows the main droplet. Then, in the present embodiment, after the second ink droplet Idp2 merges with the first ink droplet Idp1, the ink droplet Idp12 formed as a result of merging of the second ink droplet Idp2 with the first ink droplet Idp1 splits into the main droplet Mdp12 and the satellite droplet Sdp12.

As described above, in the present embodiment, the second ink droplet Idp2 merges with the first ink droplet Idp1 before splitting into a main droplet and a satellite droplet. Therefore, in the present embodiment, due to contact of the second ink droplet Idp2 with the first ink droplet Idp1, a reaction force produced between a main droplet and a satellite droplet of the second ink droplet Idp2 before splitting from each other is applied to the satellite droplet. Since the reaction force is applied to the satellite droplet, the length of the satellite droplet is reduced. That is, in the present embodiment, it is possible to prevent the satellite droplet Sdp12 splitting off from the main droplet Mdp12 of the ink droplet Idp12 formed as a result of merging of the first ink droplet Idp1 and the second ink droplet Idp2 from being long. Therefore, in the present embodiment, it is possible to suppress mist generation. Consequently, in the present embodiment, it is possible to prevent a decrease in quality of a print image.

In the present embodiment, the first ink droplet Idp1 may become separated from the ink present inside the nozzle N before merging with the second ink droplet Idp2. Adopting this configuration makes it possible to reduce the influence of the first ink droplet Idp1 on an ejection amount of the second ink droplet Idp2 that follows the first ink droplet Idp1. Consequently, in the present embodiment, it is possible to adjust the amount of the second ink droplet Idp2 into a desired amount easily. Therefore, in the present embodiment, it is possible to ensure a desired ejection amount in ejecting the second ink droplet Idp2.

In the present embodiment, the first ink droplet Idp1 may merge with the second ink droplet Idp2 without splitting into a main droplet and a satellite droplet. For example, if a satellite droplet splitting off from a main droplet of the first ink droplet Idp1 merges with the second ink droplet Idp2, the speed of the second ink droplet Idp2 decreases. In this case, there is a possibility that the second ink droplet Idp2 might fail to catch up with the main droplet of the first ink droplet Idp1 before landing onto a surface of the recording paper P and thus fail to merge with the first ink droplet Idp1. To avoid this, in the present embodiment, for example, the piezoelectric element PZ may operate to cause ejection of the first ink droplet Idp1 and the second ink droplet Idp2 from the nozzle N such that the first ink droplet Idp1 merges with the second ink droplet Idp2 without splitting into a main droplet and a satellite droplet. Adopting this configuration makes it possible to prevent a decrease in the speed of the second ink droplet Idp2 and suppress non-merging of the second ink droplet Idp2 with the first ink droplet Idp1 before landing onto a surface of the recording paper P.

In the present embodiment, the second ink droplet Idp2 may become merged with the first ink droplet Idp1 before becoming separated from the ink present inside the nozzle N. In this case, for example, when the ink droplet Idp12 formed as a result of merging of the first ink droplet Idp1 and the second ink droplet Idp2 becomes separated from the ink present inside the nozzle N, the portion, of the ink droplet Idp12, cut from the ink present inside the nozzle N is pulled in the −Z direction, which is the ejecting direction. Therefore, a −Z-directional force is applied to, of the tail portion of the ink droplet Idp12, the portion that is close to the nozzle surface NSF. Consequently, the speed of the rear-end portion of the tail portion of the ink droplet Idp12 increases. This makes it possible to prevent the tail portion of the ink droplet Idp12 from being long and thus prevent the satellite droplet Sdp12 from being long.

In the present embodiment, the second ink droplet Idp2 may merge with the first ink droplet Idp1 before traveling a first distance from the nozzle surface NSF. The first distance is a distance that is twice as long as the distance Z10. The distance Z10 is a distance from the nozzle surface NSF to the leading end of the first ink droplet Idp1 at the point in time of separation of the first ink droplet Idp1 from the ink present inside the nozzle N. Also in this case, it is possible to prevent the satellite droplet Sdp12 from being long.

In the present embodiment, the waveform PD1 includes the waveform Pep1, along which the potential of the drive signal COM changes to the level VL such that the capacity of the cavity CV will expand, and the waveform Pcn1, along which the potential of the drive signal COM changes from the level VL to the level VH such that the capacity of the cavity CV will contract. The waveform PD2 includes the waveform Pep2, along which the potential of the drive signal COM changes to the level VL such that the capacity of the cavity CV will expand, and the waveform Pcn2, along which the potential of the drive signal COM changes from the level VL to the level VH such that the capacity of the cavity CV will contract. The waveform Pcn1 includes the waveform PcnF1, along which the potential of the drive signal COM changes from the level VL to the level V1, which is between the level VL and the level VH, the waveform PcnS1, along which the potential of the drive signal COM is kept at the level V1, and the waveform PcnT1, along which the potential of the drive signal COM changes from the level V1 to the level VH. The waveform Pcn2 includes the waveform PcnF2, along which the potential of the drive signal COM changes from the level VL to the level V2, which is between the level VL and the level VH, the waveform PcnS2, along which the potential of the drive signal COM is kept at the level V2, and the waveform PcnT2, along which the potential of the drive signal COM changes from the level V2 to the level VH.

As described above, in the present embodiment, the waveform Pcn of each of the waveform PD1 and the waveform PD2 that are included in the drive signal COM is a two-step push waveform, along which contraction of the capacity of the cavity CV is performed in two steps. That is, in the present embodiment, the piezoelectric element PZ is driven using the drive signal COM including the two waveforms PD1 and PD2 each including a two-step push waveform. Therefore, in the present embodiment, it is possible to prevent the satellite droplet Sdp12 from being long while forming a desired amount of the main droplet Mdp12.

In the present embodiment, the period TcnS1 of the waveform PcnS1 and the period TcnS2 of the waveform PcnS2 may have a length that is not less than one-fifth but not greater than one-fourth of the natural vibration cycle of the ejecting portion D. Also in this case, it is possible to reduce the length of the satellite droplet Sdp12.

In the present embodiment, a potential change amount of the waveform PcnF1 and a potential change amount of the waveform PcnF2 may be not greater than one-third of an amount of potential change from the level VL to the level VH. Also in this case, it is possible to reduce the length of the satellite droplet Sdp12.

In the present embodiment, a potential change amount of the waveform PcnF2 may be larger than a potential change amount of the waveform PcnF1. When a potential change amount of the waveform PcnF for ejecting an ink droplet from the nozzle N is relatively large, the ejection speed of the ink droplet will be higher than when the potential change amount of the waveform PcnF is relatively small. Therefore, in the present embodiment, by setting the potential change amount of the waveform PcnF2 to be larger than the potential change amount of the waveform PcnF1, it is possible to make the speed of the second ink droplet Idp2 higher than the speed of the first ink droplet Idp1.

In the present embodiment, a potential change amount of the waveform PcnT1 per unit time may be smaller than a potential change amount of the waveform PcnT2 per unit time. When a potential change amount of the waveform PcnT per unit time for separating an ink droplet from ink present inside the nozzle N is relatively small, the ejection speed of the ink droplet will be lower than when the potential change amount of the waveform PcnT per unit time is relatively large. Therefore, in the present embodiment, by setting the potential change amount of the waveform PcnT1 per unit time to be smaller than the potential change amount of the waveform PcnT2 per unit time, it is possible to make the speed of the second ink droplet Idp2 higher than the speed of the first ink droplet Idp1.

In the present embodiment, the waveform PD1 further includes the waveform Peh1, which is continuous from the waveform Pep1 and continuous to the waveform Pcn1 and along which the potential of the drive signal COM is kept at the level VL so as to maintain the capacity of the cavity CV. The waveform PD2 further includes the waveform Peh2, which is continuous from the waveform Pep2 and continuous to the waveform Pcn2 and along which the potential of the drive signal COM is kept at the level VL so as to maintain the capacity of the cavity CV. The difference between the period Tsm1, which is equal to a sum of the period Tep1 of the waveform Pep1 and the period Teh1 of the waveform Peh1, and the period of one half of the natural vibration cycle of the ejecting portion D may be larger than the difference between the period Tsm2, which is equal to a sum of the period Tep2 of the waveform Pep2 and the period Teh2 of the waveform Peh2, and the period of one half of the natural vibration cycle of the ejecting portion D. When the difference between the period Tsm, which is from the start of the waveform Pep to the start of the waveform Pcn, and the period of one half of the natural vibration cycle of the ejecting portion D is relatively small, the ejection speed of the ink droplet will be higher than when the difference between the period Tsm and the period of one half of the natural vibration cycle of the ejecting portion D is relatively large. Therefore, in the present embodiment, by setting the difference between the period Tsm and the period of one half of the natural vibration cycle of the ejecting portion D in the waveform PD1 to be larger than the difference between the period Tsm and the period of one half of the natural vibration cycle of the ejecting portion D in the waveform PD2, it is possible to make the speed of the second ink droplet Idp2 higher than the speed of the first ink droplet Idp1.

In the present embodiment, the waveform PD1 further includes the waveform Pch1, along which the potential of the drive signal COM is kept at the level VH so as to maintain the capacity of the cavity CV contracted by the waveform Pcn1, and the waveform Pdm1, along which the potential of the drive signal COM changes so as to cause the capacity of the cavity CV maintained by the waveform Pch1 to expand. The waveform PD2 further includes the waveform Pch2, along which the potential of the drive signal COM is kept at the level VH so as to maintain the capacity of the cavity CV contracted by the waveform Pcn2, and the waveform Pdm2, along which the potential of the drive signal COM changes so as to cause the capacity of the cavity CV maintained by the waveform Pch2 to expand. The drive signal COM further includes the waveform PW1, along which the potential of the drive signal COM is kept at the level V0, which is a level at the time of start of the waveform Pep1, before the waveform Pep1 starts, and the waveform PW2, which is continuous from the waveform Pdm1 and continuous to the waveform Pep2 and along which the potential of the drive signal COM is kept at the level V0, which is a level at the time of start of the waveform Pep2. The period Tpw2 of the waveform PW2 may be shorter than the period Tpw1 of the waveform PW1. Also in this case, it is possible to make the speed of the second ink droplet Idp2 higher than the speed of the first ink droplet Idp1.

In the present embodiment, the period Tpw2 of the waveform PW2 may be not less than one-sixth but not greater than one-fifth of the natural vibration cycle of the ejecting portion D. Also in this case, it is possible to make the speed of the second ink droplet Idp2 higher than the speed of the first ink droplet Idp1.

In the present embodiment, a potential change amount of the waveform Pep2 may be larger than a potential change amount of the waveform Pep1. Also in this case, it is possible to make the speed of the second ink droplet Idp2 higher than the speed of the first ink droplet Idp1.

In the present embodiment, a potential change amount of the waveform Pep2 per unit time may be larger than a potential change amount of the waveform Pep1 per unit time. When a potential change amount of the waveform Pep corresponding to an expansion element per unit time is relatively large, the ejection speed of the ink droplet will be higher than when the potential change amount of the waveform Pep per unit time is relatively small. Therefore, in the present embodiment, by setting the potential change amount of the waveform Pep2 per unit time to be larger than the potential change amount of the waveform Pep1 per unit time, it is possible to make the speed of the second ink droplet Idp2 higher than the speed of the first ink droplet Idp1.

As described above, in the present embodiment, the speed of ejection of the second ink droplet Idp2 from the nozzle N is higher than the speed of ejection of the first ink droplet Idp1 from the nozzle N. Therefore, in the present embodiment, it is possible to ensure that the second ink droplet Idp2 will merge with the first ink droplet Idp1 before the first ink droplet Idp1 lands onto a surface of the recording paper P.

In the present embodiment, the viscosity of ink present inside the nozzle N may be not less than 10 millipascal seconds. The present embodiment makes it possible to reduce the length of the satellite droplet Sdp12, also when the viscosity of ink present inside the nozzle N is high.

2. Modification Examples

The exemplary embodiment described above can be modified in various ways. Some specific examples of modification are described below. Any two or more modification examples selected from among the examples described below may be combined as long as they are not contradictory to each other or one another. In each modification example described below, the same reference numerals as those used in the description and illustration of the foregoing embodiment will be assigned to elements that are equivalent to those in the foregoing embodiment in terms of operation and/or function, and a detailed explanation of them is omitted.

First Modification Example

In the foregoing embodiment, a case where the drive signal COM includes two waveforms PD provided in the unit period TP has been described as an example. However, the scope of the present disclosure is not limited to such an exemplary configuration. For example, the drive signal COM may include three or more waveforms PD provided in the unit period TP.

Figure 9:
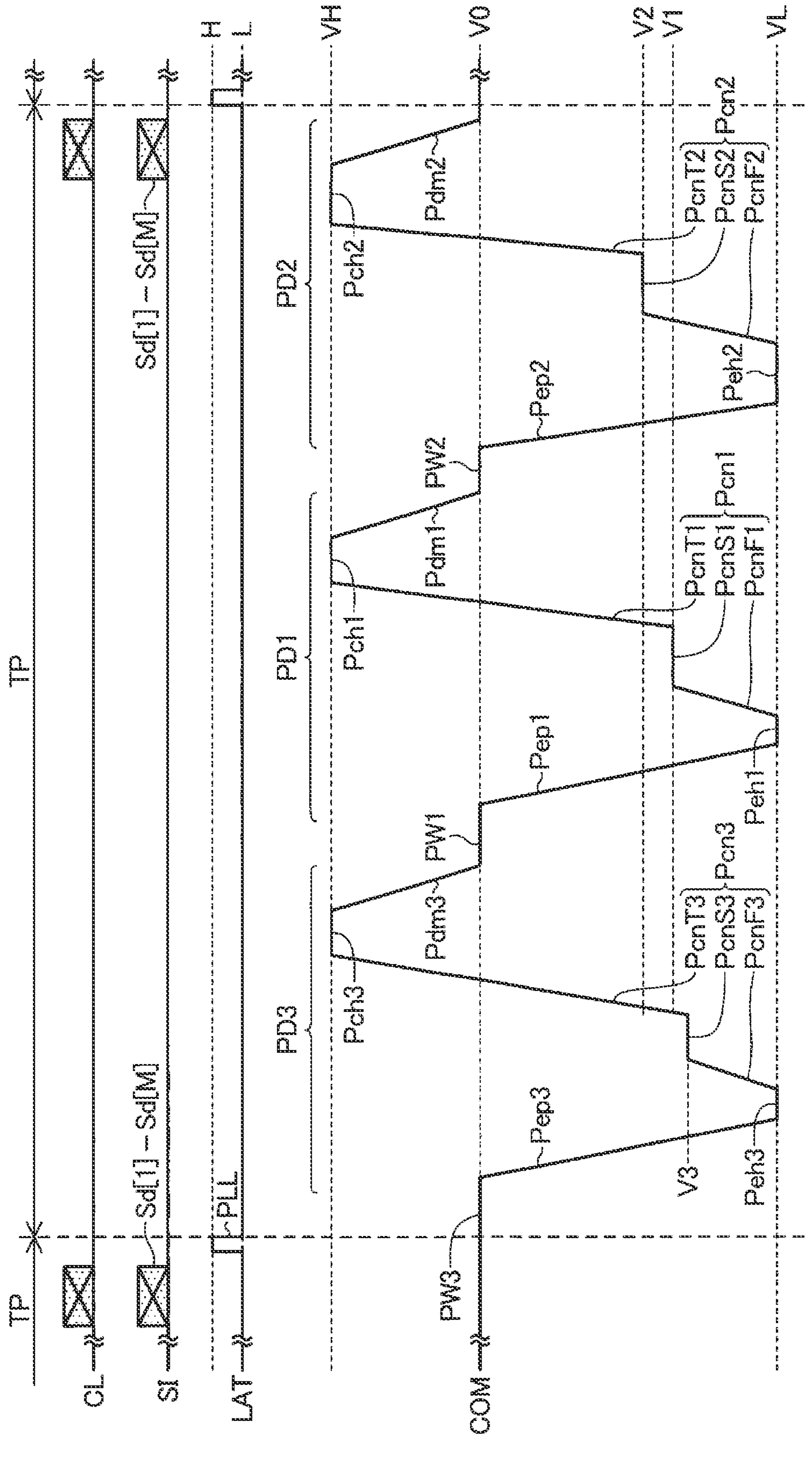
FIG. 9 is a timing chart for explaining an example of the drive signal according to a first modification example.

FIG. 9 is a timing chart for explaining an example of the drive signal COM according to a first modification example. The same reference numerals as those used in the description and illustration of the foregoing embodiment will be assigned to elements that are the same as, or similar to, those having been explained with reference to FIGS. 1 to 8, and a detailed explanation of them is omitted. In the example illustrated in FIG. 9, three ink droplets are ejected from the nozzle N within the same unit period TP, and these three ink droplets merge together before landing onto a surface of the recording paper P, thereby forming a single dot on the recording paper P. The three ink droplets constitute an example of a "plurality of liquid droplets".

The drive signal COM illustrated in FIG. 9 is the same as the drive signal COM illustrated in FIG. 6, except that a waveform PD3 and a waveform PW3 are added to drive signal COM illustrated in FIG. 6. For example, the drive signal COM includes the waveforms PD1, PD2, and PD3, which cause pressure changes in ink present inside the cavity CV, the waveform PW1, which is continuous from the waveform PD3 and continuous to the waveform PD1, the waveform PW2, which is continuous from the waveform PD1 and continuous to the waveform PD2, and the waveform PW3. For example, the waveform PD3 is a waveform anterior to the waveform PD1. The waveform PW3 is a waveform along which the potential of the drive signal COM is kept at the level V0, which is a level at the time of start of the waveform PD3, before the waveform PD3 starts.

The waveforms PD1, PD2, and PD3 constitute an example of a "plurality of drive waveforms". In the description below, the waveforms PD1, PD2, and PD3 will be referred to also as a waveform PD without making a distinction among them.

The waveform PD3 is a pull-push-pull waveform, similarly to the waveform PD1. A detailed explanation of the same elements as those of the waveform PD1 will not be given below.

The waveform PD3 is a waveform specifying that, for example, the potential of the drive signal COM changes from the level V0 to the level VL, next to a level V3, next to the level VH, and then returns to the level V0. The level V3 is a level between the level V0 and level VL. For example, the level V1 and the level V3 are determined such that the speed of the ink droplet Idp ejected from the nozzle N due to being driven by the waveform PD1 will be higher than the speed of the ink droplet Idp ejected from the nozzle N due to being driven by the waveform PD3. For example, the level V3 is a level lower than the level V1.

In the description below, of the waveform PD3, a portion where the potential of the drive signal COM changes from the level V0 to the level VL will be referred to also as a waveform Pep3, and a portion where the potential of the drive signal COM is kept at the level VL will be referred to also as a waveform Peh3. Of the waveform PD3, a portion where the potential of the drive signal COM changes from the level VL to the level VH will be referred to also as a waveform Pcn3, and a portion where the potential of the drive signal COM is kept at the level VH will be referred to also as a waveform Pch3. Of the waveform PD3, a portion where the potential of the drive signal COM changes from the level VH to the level V0 will be referred to also as a waveform Pdm3. That is, the waveform PD3 includes the waveforms Pep3, Peh3, Pcn3, Pch3, and Pdm3. The waveform Pcn3 includes a waveform PcnF3, along which the potential of the drive signal COM changes from the level VL to the level V3, a waveform PcnS3, along which the potential of the drive signal COM is kept at the level V3, and a waveform PcnT3, along which the potential of the drive signal COM changes from the level V3 to the level VH.

Except for a potential change amount of the waveform PcnF3, etc., the waveform PD3 is similar to the waveform PD1. For example, the waveform Pcn3 is a waveform along which the potential of the drive signal COM changes so as to eject the ink droplet Idp from the nozzle N by causing the capacity of the cavity CV having been expanded by the waveform Pep3 to contract. The waveform Pcn3 corresponds to a contraction element that is similar to the waveform Pcn1. Therefore, when the drive signal COM is supplied as the individual drive signal Vin[m] to the ejecting portion D[m], some part of ink present inside the ejecting portion D[m] is ejected as the first one of the ink droplets Idp from the nozzle N due to being driven by the waveform Pcn3, along which the potential of the individual drive signal Vin[m] changes from a low level to a high level. In the example illustrated in FIG. 9, the ink droplet Idp ejected from the nozzle N due to being driven by the waveform PD1 is the second one of the ink droplets Idp, and the ink droplet Idp ejected from the nozzle N due to being driven by the waveform PD2 is the third one of the ink droplets Idp.

The waveform Pep3 corresponds to an expansion element that is similar to the waveform Pep1. The waveform Peh3 corresponds to an expansion maintaining element that is similar to the waveform Peh1. The waveform Pch3 corresponds to a contraction maintaining element that is similar to the waveform Pch1. The waveform Pdm3 corresponds to a vibration damping element that is similar to the waveform Pdm1. The waveforms Pep1, Pep2, and Pep3 constitute an example of an "expansion waveform". The waveforms Peh1, Peh2, and Peh3 constitute an example of an "expansion maintaining waveform". The waveforms Pcn1, Pcn2, and Pcn3 constitute an example of a "contraction waveform". The waveforms PcnF1, PcnF2, and PcnF3 constitute an example of a "first waveform". The waveforms PcnS1, PcnS2, and PcnS3 constitute an example of a "second waveform". The waveforms PcnT1, PcnT2, and PcnT3 constitute an example of a "third waveform".

In this modification example, similarly to the foregoing embodiment, each element of the waveform PD1 and the waveform PD2 is determined such that the speed of the third ink droplet Idp ejected due to being driven by the waveform PD2 will be higher than the speed of the second ink droplet Idp ejected due to being driven by the waveform PD1. Similarly, each element of the waveform PD1 and the waveform PD3 is determined such that the speed of the second ink droplet Idp ejected due to being driven by the waveform PD1 will be higher than the speed of the first ink droplet Idp ejected due to being driven by the waveform PD3. Setting conditions for making the speed of the second ink droplet Idp ejected due to being driven by the waveform PD1 higher than the speed of the first ink droplet Idp ejected due to being driven by the waveform PD3 are the same as the setting conditions described earlier with reference to FIG. 6. For example, an explanation of the setting conditions for this modification example can be given by reading the foregoing description of the first to sixth setting conditions while replacing the elements of the waveform PD1 and the elements of the waveform PD2 with the elements of the waveform PD3 and the elements of the waveform PD1 respectively.

In this modification example, the waveforms PcnF3, PcnS3, and PcnT3, which are included in the waveform Pcn3, are set in such a way as to make a satellite droplet short, similarly to the waveforms PcnF, PcnS, and PcnT of each of the waveform Pcn1 and the waveform Pcn2.

As described above, the same effects as those of the foregoing embodiment can be obtained also in this modification example. For example, in this modification example, it is possible to eject a plurality of ink droplets Idp from the nozzle N within the same unit period TP such that these ink droplets will merge together before landing onto a surface of the recording paper P. Moreover, also in this modification example, it is possible to prevent the satellite droplet splitting off from the ink droplet Idp formed as a result of merging of the plurality of ink droplets Idp from being long. Therefore, also in this modification example, it is possible to suppress mist generation and thus prevent a decrease in quality of a print image.

Second Modification Example

In the foregoing embodiment and the above modification example, an amount of the second ink droplet Idp2 may be equal to or larger than an amount of the first ink droplet Idp1. The same effects as those of the foregoing embodiment and the above modification example can be obtained also in this modification example.

Third Modification Example

In the foregoing embodiment and the above modification examples, a case where the piezoelectric element PZ becomes displaced in the −Z direction due to a change in the potential of the individual drive signal Vin[m] from a low level to a high level has been described as an example. However, the scope of the present disclosure is not limited to such an exemplary configuration. For example, a piezoelectric element PZ configured to become displaced in the −Z direction due to a change in the potential of the individual drive signal Vin[m] from a high level to a low level may be used. In this case, for example, the potential of the drive signal COM changes from a low level to a high level at a portion corresponding to the expansion element, and changes from a high level to a low level at a portion corresponding to the contraction element. The same effects as those of the foregoing embodiment and the above modification examples can be obtained also in this modification example.

Fourth Modification Example

In the foregoing embodiment and the above modification examples, a case where each head unit 3 has one nozzle row NL has been described as an example. However, the scope of the present disclosure is not limited to such an exemplary configuration. For example, each head unit 3 may have a plurality of nozzle rows NL. The same effects as those of the foregoing embodiment and the above modification examples can be obtained also in this modification example.

Fifth Modification Example

In the foregoing embodiment and the above modification examples, a case where the ink-jet printer 1 includes four head units 3 has been described as an example. However, the scope of the present disclosure is not limited to such an exemplary configuration. For example, the ink-jet printer 1 may include one, two, or three head units 3. The ink-jet printer 1 may include five head units 3 or more.

Sixth Modification Example

In the foregoing embodiment and the above modification examples, the level at the time of start of the waveform Pep1 corresponding to the expansion element of the waveform PD1 may be lower than the level at the time of start of the waveform Pep2 corresponding to the expansion element of the waveform PD2. Also in this case, the speed of the ink droplet Idp ejected from the nozzle N due to being driven by the waveform PD2 will be higher than the speed of the ink droplet Idp ejected from the nozzle N due to being driven by the waveform PD1. The same effects as those of the foregoing embodiment and the above modification examples can be obtained also in this modification example.

Seventh Modification Example

In the foregoing embodiment and the above modification examples, a case where the ink-jet printer 1 is a serial printer has been described as an example. However, the scope of the present disclosure is not limited to such an exemplary configuration. For example, the ink-jet printer 1 may be a so-called line printer, in which plural nozzles N are arranged in the head unit 3 in a line-extending manner to be wider than the width of the recording paper P. The same effects as those of the foregoing embodiment and the above modification examples can be obtained also in this modification example.

Eighth Modification Example

In the foregoing embodiment and the above modification examples, a case where the drive signal COM includes a single drive signal has been described as an example. However, the scope of the present disclosure is not limited to such an exemplary configuration. For example, besides the drive signal COM illustrated in FIG. 6, the drive signal COM may include a drive signal having a waveform different from the waveform PD1 and the waveform PD2 of the drive signal COM. The same effects as those of the foregoing embodiment and the above modification examples can be obtained also in this modification example.

What is claimed is:

1. A liquid ejecting apparatus, comprising:

a liquid ejecting head having an ejecting portion, the ejecting portion including
  a nozzle from which liquid droplets are ejected,
  a pressure compartment that is in communication with the nozzle, and
  a drive element that causes pressure changes in a liquid present inside the pressure compartment in accordance with a drive signal; and
a control unit that controls supply of the drive signal to the drive element, wherein
the drive signal includes
  a first drive waveform, and
  a second drive waveform posterior to the first drive waveform,
the first drive waveform includes
  a first expansion waveform along which potential of the drive signal changes to a first level such that capacity of the pressure compartment expands, and
  a first contraction waveform along which the potential of the drive signal changes from the first level to a second level such that the capacity of the pressure compartment contracts,
the second drive waveform includes
  a second expansion waveform along which the potential of the drive signal changes to the first level such that the capacity of the pressure compartment expands, and
  a second contraction waveform along which the potential of the drive signal changes from the first level to the second level such that the capacity of the pressure compartment contracts,
the first contraction waveform includes
  a first segment waveform along which the potential of the drive signal changes from the first level to a first intermediate level between the first level and the second level,
  a second segment waveform along which the potential of the drive signal is kept at the first intermediate level, and
  a third segment waveform along which the potential of the drive signal changes from the first intermediate level to the second level,
the second contraction waveform includes
  a fourth segment waveform along which the potential of the drive signal changes from the first level to a second intermediate level between the first level and the second level,
  a fifth segment waveform along which the potential of the drive signal is kept at the second intermediate level, and
  a sixth segment waveform along which the potential of the drive signal changes from the second intermediate level to the second level, and
due to the supply of the drive signal, the drive element operates to cause ejection of a first liquid droplet from the nozzle in accordance with the first drive waveform and operates to cause ejection of a second liquid droplet from the nozzle in accordance with the second drive waveform such that the second liquid droplet merges with the first liquid droplet before the first liquid droplet lands onto a medium.

2. The liquid ejecting apparatus according to claim 1, wherein
a period of the second segment waveform and a period of the fifth segment waveform have a length that is not less than one-fifth but not greater than one-fourth of a natural vibration cycle of the ejecting portion.

3. The liquid ejecting apparatus according to claim 1, wherein
a potential change amount of the first segment waveform and a potential change amount of the fourth segment waveform are not greater than one-third of an amount of potential change from the first level to the second level.

4. The liquid ejecting apparatus according to claim 1, wherein
a potential change amount of the fourth segment waveform is larger than a potential change amount of the first segment waveform.

5. The liquid ejecting apparatus according to claim 1, wherein
a potential change amount of the third segment waveform per unit time is smaller than a potential change amount of the sixth segment waveform per unit time.

6. The liquid ejecting apparatus according to claim 1, wherein
the first drive waveform further includes a first expansion maintaining waveform that is continuous from the first expansion waveform and continuous to the first contraction waveform and along which the potential of the drive signal is kept at the first level so as to maintain the capacity of the pressure compartment,
the second drive waveform further includes a second expansion maintaining waveform that is continuous from the second expansion waveform and continuous to the second contraction waveform and along which the potential of the drive signal is kept at the first level so as to maintain the capacity of the pressure compartment, and a difference between a sum of a period of the first expansion waveform and a period of the first expansion maintaining waveform and a period of one half of a natural vibration cycle of the ejecting portion is larger than a difference between a sum of a period of the second expansion waveform and a period of the second expansion maintaining waveform and the period of one half of the natural vibration cycle of the ejecting portion.

7. The liquid ejecting apparatus according to claim 1, wherein the first drive waveform further includes a first contraction maintaining waveform along which the potential of the drive signal is kept at the second level so as to maintain the capacity of the pressure compartment contracted by the first contraction waveform, and a first vibration damping waveform along which the potential of the drive signal changes so as to cause the capacity of the pressure compartment maintained by the first contraction maintaining waveform to expand, the second drive waveform further includes a second contraction maintaining waveform along which the potential of the drive signal is kept at the second level so as to maintain the capacity of the pressure compartment contracted by the second contraction waveform, and a second vibration damping waveform along which the potential of the drive signal changes so as to cause the capacity of the pressure compartment maintained by the second contraction maintaining waveform to expand, the drive signal further includes a first wait waveform along which the potential of the drive signal is kept at a level at a time of start of the first expansion waveform before the first expansion waveform starts, and a second wait waveform that is continuous from the first vibration damping waveform and continuous to the second expansion waveform and along which the potential of the drive signal is kept at a level at a time of start of the second expansion waveform, and a period of the second wait waveform is shorter than a period of the first wait waveform.

8. The liquid ejecting apparatus according to claim 7, wherein the period of the second wait waveform is not less than one-sixth but not greater than one-fifth of a natural vibration cycle of the ejecting portion.

9. The liquid ejecting apparatus according to claim 1, wherein a potential change amount of the second expansion waveform is larger than a potential change amount of the first expansion waveform.

10. The liquid ejecting apparatus according to claim 1, wherein a potential change amount of the second expansion waveform per unit time is larger than a potential change amount of the first expansion waveform per unit time.

11. The liquid ejecting apparatus according to claim 1, wherein an ejection speed of the second liquid droplet from the nozzle is higher than an ejection speed of the first liquid droplet from the nozzle.

12. The liquid ejecting apparatus according to claim 1, wherein an amount of the second liquid droplet is not smaller than an amount of the first liquid droplet.

13. The liquid ejecting apparatus according to claim 1, wherein the drive signal includes a plurality of drive waveforms including the first drive waveform and the second drive waveform in a cycle, a plurality of liquid droplets ejected from the nozzle in accordance with the plurality of drive waveforms merge together before landing onto the medium, the first drive waveform is a second-to-last drive waveform among the plurality of drive waveforms, and the second drive waveform is a last drive waveform among the plurality of drive waveforms.

14. The liquid ejecting apparatus according to claim 13, wherein each of the plurality of drive waveforms includes an expansion waveform along which the potential of the drive signal changes to the first level such that the capacity of the pressure compartment expands, and a contraction waveform along which the potential of the drive signal changes from the first level to the second level such that the capacity of the pressure compartment contracts, the contraction waveform includes a first waveform along which the potential of the drive signal changes from the first level to a level between the first level and the second level, a second waveform along which the potential of the drive signal is kept at a level at a time of end of the first waveform, and a third waveform along which the potential of the drive signal changes from the level at the time of end of the first waveform to the second level, in the second-to-last drive waveform, the expansion waveform is the first expansion waveform, the contraction waveform is the first contraction waveform, the first waveform is the first segment waveform, the second waveform is the second segment waveform, and the third waveform is the third segment waveform, and in the last drive waveform, the expansion waveform is the second expansion waveform, the contraction waveform is the second contraction waveform, the first waveform is the fourth segment waveform, the second waveform is the fifth segment waveform, and the third waveform is the sixth segment waveform.

15. The liquid ejecting apparatus according to claim 1, wherein a viscosity of the liquid present inside the nozzle is not less than ten millipascal seconds.

16. A method for controlling a liquid ejecting head having an ejecting portion, the ejecting portion including a nozzle from which liquid droplets are ejected, a pressure compartment that is in communication with the nozzle, and a drive element that causes pressure changes in a liquid present inside the pressure compartment in accordance with a drive signal, the method comprising:

controlling supply of the drive signal to the drive element; wherein the drive signal includes
a first drive waveform, and
a second drive waveform posterior to the first drive waveform,
the first drive waveform includes
a first expansion waveform along which potential of the drive signal changes to a first level such that capacity of the pressure compartment expands, and
a first contraction waveform along which the potential of the drive signal changes from the first level to a second level such that the capacity of the pressure compartment contracts,
the second drive waveform includes
a second expansion waveform along which the potential of the drive signal changes to the first level such that the capacity of the pressure compartment expands, and
a second contraction waveform along which the potential of the drive signal changes from the first level to the second level such that the capacity of the pressure compartment contracts,
the first contraction waveform includes
a first segment waveform along which the potential of the drive signal changes from the first level to a first intermediate level between the first level and the second level,
a second segment waveform along which the potential of the drive signal is kept at the first intermediate level, and
a third segment waveform along which the potential of the drive signal changes from the first intermediate level to the second level,
the second contraction waveform includes
a fourth segment waveform along which the potential of the drive signal changes from the first level to a second intermediate level between the first level and the second level,
a fifth segment waveform along which the potential of the drive signal is kept at the second intermediate level, and
a sixth segment waveform along which the potential of the drive signal changes from the second intermediate level to the second level, and
due to the supply of the drive signal, the drive element operates to cause ejection of a first liquid droplet from the nozzle in accordance with the first drive waveform and operates to cause ejection of a second liquid droplet from the nozzle in accordance with the second drive waveform such that the second liquid droplet merges with the first liquid droplet before the first liquid droplet lands onto a medium.

* * * * *